United States Patent
Kobayashi et al.

(10) Patent No.: US 8,957,848 B2
(45) Date of Patent: Feb. 17, 2015

(54) DATA INPUT DEVICE FOR ELECTRONIC INSTRUMENT AND METHOD OF ENTERING DATA

(75) Inventors: Tsunehisa Kobayashi, Nagano (JP); Kosuke Mizutani, Nagano (JP); Takamichi Kitano, Nagano (JP)

(73) Assignee: Minebea Co., Ltd., Nagano (JP)

( * ) Notice: Subject to any disclaimer, the term of this patent is extended or adjusted under 35 U.S.C. 154(b) by 624 days.

(21) Appl. No.: 13/282,742

(22) Filed: Oct. 27, 2011

(65) Prior Publication Data

US 2012/0105194 A1 May 3, 2012

(30) Foreign Application Priority Data

Oct. 29, 2010 (JP) .................. 2010-243630
Dec. 16, 2010 (JP) .................. 2010-280801

(51) Int. Cl.
*G09G 5/00* (2006.01)
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04104* (2013.01)
USPC ..................................... 345/156

(58) Field of Classification Search
CPC ....... G06F 3/044; G06F 3/041; G06F 3/0487; G06F 3/0489; G06F 3/04895
USPC ..................................... 345/156
See application file for complete search history.

(56) References Cited

U.S. PATENT DOCUMENTS

| 7,256,714 B2* | 8/2007 | Philipp ..................... 341/33 |
| 2004/0140913 A1 | 7/2004 | Engelmann et al. |
| 2006/0192690 A1* | 8/2006 | Philipp ..................... 341/33 |

(Continued)

FOREIGN PATENT DOCUMENTS

| JP | 10-124240 A | 5/1998 |
| JP | 2004-192638 A | 7/2004 |

(Continued)

OTHER PUBLICATIONS

Japanese Office Action issued on Feb. 26, 2014 in the corresponding JP Patent Application 2010-243630 with the English translation thereof.

*Primary Examiner* — Jonathan Boyd
(74) *Attorney, Agent, or Firm* — Carrier Blackman & Associates, P.C.; Joseph P. Carrier; Jeffrey T. Gedeon

(57) ABSTRACT

A data input device includes: an operation section including an electrostatic capacitance type touch sensor; and a control circuit section which determines if a data input operation is true or false and sends an output data corresponding to a sensed data only when the data input operation is determined as true. When one or more of the sensed data are entered into the control circuit section, a coordinate is identified which determines the data input operation as true based on invalidation determination region information previously prepared for each of coordinates corresponding to the sensed data, wherein while the sensed data for the coordinate indentified is entered, the data input operation, which is implemented to a coordinate other than the identified coordinate to determine the data input operation as true among a group aggregate of the coordinates corresponding to the sensed data within an invalidation determination region, is determined as false.

13 Claims, 14 Drawing Sheets

(56) References Cited

U.S. PATENT DOCUMENTS

2007/0273561 A1* 11/2007 Philipp ........................ 341/33
2008/0007434 A1* 1/2008 Hristov ........................ 341/22
2010/0193258 A1 8/2010 Simmons et al.
2011/0157085 A1 6/2011 Philipp

FOREIGN PATENT DOCUMENTS

JP 2007-317201 A 12/2007
JP 2010-533329 A 10/2010

* cited by examiner

DATA INPUT DEVICE FOR ELECTRONIC INSTRUMENT AND METHOD OF ENTERING DATA

BACKGROUND OF THE INVENTION

1. Field of the Invention

The present invention relates to a data input device for an electronic instrument and a method of entering data, and more particularly to a technique for preventing an incorrect data entry in a data input device provided with an electrostatic capacitance type touch sensor as well as in a data entry method using such a data input device.

2. Description of the Related Art

In a traditional data input device for an electronic instrument, a data input operation by an operator is sensed by means of an electrostatic capacitance type touch sensor. Such a data input device includes a data input operation surface located at the top thereof and having a flat plane and is advantageous in enabling a highly sensitive sensing of data entered and at the same time presenting a high degree of both functionality and aesthetic appearance. Consequently, in recent years, such a data input device is used widely more and more for various kinds of electronic instruments.

In the data input device described above, a plurality of segments are provided on the data input operation surface so as to correspond to a plurality of key switches (hereinafter, the segments are referred to simply as "key switches" as appropriate), wherein when the fingers of an operator touch the key switches on the data input operation surface, the touching operation on the key switches is sensed whereby the output data corresponding to the key switches are sent to an electronic instrument. In such a data input device as described above, however, a key switch which the operator does not intend to touch may be accidentally touched as shown in FIG. 11, thus causing an incorrect data entry.

A data input device shown in FIG. 11 includes a touch sensor system which includes touch sensors 101, 102 and 103 corresponding respectively to three key switches and a data sensing circuit 106 to sense the electrostatic capacitance variation of the touch sensors 101, 102 and 103. In this connection, the touch sensors 101, 102 and 103 may be disposed on the lower or upper side of a data input operation surface (not shown) which is provided with the key switches.

In FIG. 11, it is assumed that the operator puts a finger 105 in touch with a relevant part on the data input operation surface so as to implement a data input operation only to a key switch which corresponds to the touch sensor 101. Under the circumstance described above, however, it can possibly happen that depending on the sensitivity of the touch sensor system, the data input operation is wrongly interpreted (despite the intention of the operator) as being implemented also to a key switch which corresponds to another touch sensor (for example, the touch sensor 102) and close to which the finger 105 is put. Or, it is possible that when the operator intends to implement a data input operation to a given key switch using the finger 105, a portion of the body of the operator other than the finger 105 (for example, another finger, a palm, or the like) touches an unintended key switch, thus causing an incorrect data entry.

In order to prevent such an incorrect data entry, a method is conventionally proposed in which assuming the finger position of the operator for implementing a data input operation, the priority order of the key switch operation for entering data is previously set up in accordance with the order of the likelihood of the data input operation to be practically implemented, wherein when a signal indicating data input operations for a plurality of key switches is sensed by the touch sensor system, it is determined that only a data input operation for the key switch, to which the top priority is assigned, is executed (refer to, for example, Japanese Patent Application Laid-Open No. 2007-317201).

The method described in Japanese Patent Application Laid-Open No. 2007-317201 is premised on that the operator conducts a data input operation with one finger (for example, an index finger or a thumb) so as not to touch two or more key switches at the same time in the normal operation. Accordingly, the method can be appropriately applied only to a data input device which is provided with a relatively small number of key switches, for example, an operation panel for a remote control and a home electric appliance.

On the other hand, in the case of a data input device (for example, a keyboard for a personal computer) which is provided with a relatively large number of key switches and in which the operator is supposed to implement a data input operation with a plurality of fingers (usually, fingers of the both hands) at a high speed, it is also strongly desired in view of operability that the operator is allowed to intentionally implement a data input operation to two or more key switches at the same time while an incorrect data entry can be prevented as described above. However, the method described in Japanese Patent Application Laid-Open No. 2007-317201, when applied for use in the data input device with a relatively large number of key switches, does not enable prevention of an incorrect data entry while maintaining the desired operability.

SUMMARY OF THE INVENTION

The present invention has been made in light of the above problem, and it is an object of the present invention to provide a data input device for electronic instruments, which is free from an incorrect data entry and which has an enhanced operability.

The embodiment shown in the description of the present invention exemplifies a configuration of the present invention and explains on an aspect by aspect basis for facilitating understanding of a diversity of structures of the present invention. Each aspect does not limit the technical scope of the present invention, and modifications developed by replacing, eliminating a part of the constituent elements of each aspect, or further by adding some other constituent elements thereto are included in the technical scope of the present invention.

In order to achieve the above described object of the present invention, according to a first aspect of the present invention, a data input device for an electronic instrument is provided and includes: a operation section which includes a flat data input operation surface, and an electrostatic capacitance type touch sensor to sense a data input operation implemented to the data input operation surface; and a control circuit section into which a sensed data on the data input operation from the operation section is entered, and which determines if the data input operation is true or false and sends to an electronic instrument an output data corresponding to the sensed data only when the data input operation is determined as true. In the data input device described above, when one or more of the sensed data are entered into the control circuit section, the control circuit section identifies a coordinate which determines the data input operation as true based on invalidation determination region information previously prepared for each of coordinates corresponding to the one or more of the sensed data, wherein while the sensed data for the coordinate indentified is entered, the data input operation, which is implemented to a coordinate other than the identified coordinate to determine the data input operation as true among a group aggregate of the coordinates corresponding to the sensed data within an invalidation determination region, is determined as false.

Here, in the present description of the invention, the "true" data input operation refers to a data input operation which the operator of the data input device implements intentionally, and the "false" data input operation refers to a data input operation which corresponds to a coordinate, when the sensed data for a coordinate located at a particular position is entered into the control circuit section from the operation section though the operator does not implement the "true" data input operation to the particular position on the data input operation surface.

Also, in the present description of the invention, the "coordinate" refers to an arbitrary information which is used for specifying a particular position (or range) for the data input operation on the data input operation surface of the data input device, and which may be constituted by a data corresponding to the value (or range of the value) which is actually read out from an arbitrary appropriate two-dimensional coordinate established along the data input operation surface but is by no means limited thereto. For example, when a plurality of individual segments to define a position for implementation of the data input operation are provided on the data input operation surface of the data input device (typically when the segments define, what is called, key switches), an arbitrary information which corresponds to each segment on a one-to-one basis and can specify each segment is referred to as a "coordinate" of the position. Such a coordinate may be implemented by, for example, serial integers assigned to respective segments, or integer combinations assigned to respective segments.

The data input device according to the first aspect of the present invention is provided with the control circuit section in which when one or more of the sensed data are entered, a coordinate is identified which determines the data input operation as true based on an invalidation determination region information previously prepared for each of coordinates corresponding to the one or more of the sensed data, and while the sensed data for the coordinate identified is entered, the data input operation which is implemented to a coordinate other than the identified coordinate to determine the data input operation as true among a group aggregate of the coordinates corresponding to the sensed data within the invalidation determination region, is determined as false, whereby a false data input operation can be effectively determined, and thereby the operability of a highly sensitive data input device incorporating an electrostatic capacitance type touch sensor can be enhanced.

Further, in the data input device according to the first aspect of the present invention, since a simultaneous data input operation which the operator implements intentionally to two or more coordinates can be determined as true because of the structure described above, a false data input operation can be effectively determined. As a result, especially in the case of a data input device (for example, a keyboard for a personal computer) in which a relatively large number of key switches are provided on a data input operation surface and in which the operator is supposed to enter data at a high speed, for example, by using a plurality of fingers of the both hands, the operability can be significantly enhanced.

In this connection, the occurrence of a false data input operation is primarily attributed to the fact that the finger or the like of the operator is placed in proximity to or in contact with a particular coordinate on the data input operation surface in spite of the intention of the operator and the proximity or the contact is sensed by the touch sensor. Therefore, it is preferable that the invalidation determination region information is configured appropriately in consideration of a typical disposition of the hands and fingers of the operator for entering data. Also, the present invention is not limited by the factor for the occurrence of the false data input operation, and the invalidation determination region information can be configured appropriately depending on the various situations in which false data input operations occur.

In the first aspect of the present invention, the control circuit section may include: a memory section which stores information, with respect to each coordinate, whether or not there exist the sensed data for coordinates located at a position on the data input operation surface wherein the data input operation is implemented to the position, and also which stores the invalidation determination region information previously prepared for each of the coordinates at the position to which the data input operation is implemented; and a data processing section which identifies a coordinate to determine a data input operation as true within the invalidation determination region previously prepared for each of the one or more of the coordinates for which information that the sensed data is entered is stored in the memory section, and which determines the data input operation as false which is implemented to a coordinate other than the identified coordinate to determine the data input operation as true among a group aggregate of the coordinates corresponding to the sensed data in the invalidation determination region.

In the first aspect of the present invention, the data processing section may determine a data input operation as true which is implemented to a coordinate located farthest from an operator within the invalidation determination region previously prepared for each of the one or more of the coordinates for which information that the sensed data is entered is stored in the memory section.

In the first aspect of the present invention, the invalidation determination region, which is previously prepared for each of coordinates other than coordinates corresponding to one or more of particular positions previously defined, may be defined so as not to include the coordinates corresponding to the one or more of particular positions previously defined.

In order to achieve the above described object of the present invention, according to a second aspect of the present invention, a data input device for an electronic instrument is provided and includes: an operation section which includes a flat data input operation surface, and an electrostatic capacitance type touch sensor to sense a data input operation implemented to the data input operation surface; and a control circuit section into which a sensed data on the data input operation from the operation section is entered, and which determines if the data input operation is true or false and sends to an electronic instrument an output data corresponding to the sensed data only when the data input operation is determined as true. In the data input device described above, if one or more of the sensed data are entered into the control circuit section, the control circuit section identifies a coordinate which determines the data input operation as true based on invalidation determination region information previously prepared for each of coordinates corresponding to the one or more of the sensed data, wherein while the sensed data for the coordinate indentified is entered, a sensitivity for outputting the sensed data is lowered with respect to the data input operation which is implemented to a coordinate other than the identified coordinate to determine the data input operation as true among a group aggregate of the coordinates corresponding to the sensed data within an invalidation determination region.

In order to achieve the above described object of the present invention, according to a third aspect of the present invention, a data input device for an electronic instrument is provided and includes: an operation section which includes a flat data input operation surface, and an electrostatic capacitance type touch sensor to sense a data input operation implemented to the data input operation surface; and a control circuit section into which a sensed data on the data input operation from the operation section is entered, and which determines if the data input operation is true or false and sends to an electronic instrument an output data corresponding to the sensed data only when the data input operation is determined as true. In the data input device described above, if one or more of the sensed data are entered into the control circuit section, the control circuit section identifies a coordinate which determines the data input operation as true based on invalidation determination region information previously prepared for each of coordinates corresponding to the one or more of the sensed data, wherein while the sensed data for the coordinate indentified is entered, the data input operation, which is implemented to a coordinate other than the identified coordinate to determine the data input operation as true among a group aggregate of the coordinates corresponding to the sensed data within an invalidation determination region, is determined as false, and at the same time in that when the coordinate to determine the data input operation as true is identified, if the sensed data is entered for a vertex coordinate corresponding to a position located farthest from an operator within the invalidation determination region previously prepared and also if a plurality of vertex coordinates to which the sensed data are entered are disposed adjacent to one another, the control circuit section identifies the coordinate which determines the data input operation as true based on a number of the plurality of vertex coordinates, a comparison data of sensed values of the sensed data corresponding to the plurality of vertex coordinates, and a duration time information for entering the sensed data corresponding to the plurality of vertex coordinates.

The data input device according to the third aspect of the present invention is provided with the control circuit section in which when one or more of the sensed data are entered, a coordinate is identified which determines the data input operation as true based on an invalidation determination region information previously prepared for each of coordinates corresponding to the one or more of the sensed data, and while the sensed data for the coordinate identified is entered, the data input operation which is implemented to a coordinate other than the identified coordinate to determine the data input operation as true among a group aggregate of the coordinates corresponding to the sensed data within the invalidation determination region, is determined as false, whereby a false data input operation can be effectively determined, and thereby the operability of a highly sensitive data input device incorporating an electrostatic capacitance type touch sensor can be enhanced.

Further, in the data input device according to the third aspect of the present invention, since a simultaneous data input operation which the operator implements intentionally to two or more coordinates can be determined as true because of the structure described above, a false data input operation can be effectively determined. As a result, especially in the case of a data input device (for example, a keyboard for a personal computer) in which a relatively large number of key switches are provided on a data input operation surface and in which the operator is supposed to enter data at a high speed, for example, by using a plurality of fingers of the both hands, the operability can be significantly enhanced.

Especially, in the data entry according to the third aspect of the present invention, if the sensed data are entered for the vertex coordinate which corresponds to a position located farthest from the operator within the invalidation determination regions, and also even if plurality of the vertex coordinates are located adjacent to one another, the coordinate is identified which determines the data input operation as true based on the number of the plurality of vertex coordinates, the sensed value comparison information between the sensed data corresponding to the plurality of vertex coordinates, and the data entry duration time information of the sensed data corresponding to the plurality of vertex coordinates, whereby an incorrect data entry can be further effectively prevented and the operability of the data input device can be enhanced.

In this connection, the occurrence of a false data input operation is primarily attributed to the fact that the finger or the like of the operator is placed in proximity to or in contact with a particular coordinate on the data input operation surface in spite of the intention of the operator and the proximity or the contact is sensed by the touch sensor. Therefore, it is preferable that the invalidation determination region information is configured appropriately in consideration of a typical disposition of the hands and fingers of the operator for entering data. Also, the present invention is not limited by the factor for the occurrence of the false data input operation, and the invalidation determination region information can be configured appropriately depending on the various situations in which false data input operations occur.

In the third aspect of the present invention, the control circuit section may includes: a memory section which stores information, with respect to each coordinate, whether or not there exist the sensed data for coordinates located at a position on the data input operation surface wherein the data input operation is implemented to the position, and also which stores the invalidation determination region information previously prepared for each of the coordinates at the position to which the data input operation is implemented; and a data processing section which identifies a coordinate to determine a data input operation as true within the invalidation determination region previously prepared for each of the one or more of the coordinates for which information that the sensed data is entered is stored in the memory section, and which determines the data input operation as false which is implemented to a coordinate other than the identified coordinate to determine the data input operation as true among a group aggregate of the coordinates corresponding to the sensed data within the invalidation determination region, and at the same time in that when the coordinate to determine the data input operation as true is identified, if the sensed data is entered for a vertex coordinate corresponding to a position located farthest from an operator within the invalidation determination region and also if a plurality of vertex coordinates to which the sensed data are entered are disposed adjacent to one another, the control section identifies the coordinate which determines the data input operation as true based on a number of the plurality of vertex coordinates, a comparison data of sensed values of the sensed data corresponding to the plurality of vertex coordinates, and a duration time information for entering the sensed data corresponding to the plurality of vertex coordinates.

In the third aspect of the present invention, the data processing section may determine, based on the comparison data of sensed values, a data input operation as true which is implemented to vertex coordinates out of three or less of the vertex coordinates to which the sensed data is entered, excluding the vertex coordinate to which a lowest score is assigned with respect to an evaluation of a sensed value of the sensed data.

In the third aspect of the present invention, when a data entry duration time, which is taken for entering the sensed data for the vertex coordinate having a lowest score with respect to the evaluation of the sensed value of the sensed data, elapses for more than a prescribed time, the data processing section may determine, based on the data entry duration time information, the data input operation as true which is implemented to the vertex coordinate having a lowest score.

In the third aspect of the present invention, the invalidation determination region, which is previously prepared for each of coordinates other than coordinates corresponding to one or more of particular positions previously defined, may be defined so as not to include the coordinates corresponding to the one or more of particular positions previously defined.

In order to achieve the above described object of the present invention, according to a fourth aspect of the present invention, a data input device for an electronic instrument is provided and includes: an operation section which includes a flat data input operation surface, and an electrostatic capacitance type touch sensor to sense a data input operation implemented to the data input operation surface; and a control circuit section into which a sensed data on the data input operation from the operation section is entered, and which determines if the data input operation is true or false and sends to an electronic instrument an output data corresponding to the sensed data only when the data input operation is determined as true. In the data input device described above, if one or more of the sensed data are entered into the control circuit section, the control circuit section identifies a coordinate which determines the data input operation as true based on invalidation determination region information previously prepared for each of coordinates corresponding to the one or more of the sensed data, wherein while the sensed data for the coordinate indentified is entered, a sensitivity for outputting the sensed data is lowered with respect to the data input operation which is implemented to a coordinate other than the identified coordinate to determine the data input operation as true among a group aggregate of the coordinates corresponding to the sensed data within an invalidation determination region, and at the same time in that when the coordinate to determine the data input operation as true is identified, if the sensed data is entered for a vertex coordinate corresponding to a position located farthest from an operator within the invalidation determination region previously prepared and also if a plurality of vertex coordinates to which the sensed data are entered are disposed adjacent to one another, the control circuit section identifies the coordinate which determines the data input operation as true based on a number of the plurality of vertex coordinates, a comparison data of sensed values of the sensed data corresponding to the plurality of vertex coordinates, and a duration time information for entering the sensed data corresponding to the plurality of vertex coordinates.

In order to achieve the above described object of the present invention, according to a fifth aspect of the present invention, there is provided a method of entering data for a data input device for an electronic instrument, wherein the data input device includes: an operation section which includes a flat data input operation surface, and an electrostatic capacitance type touch sensor to sense a data input operation implemented to the data input operation surface; and a control circuit section into which a sensed data of the data input operation sent from the operation section is entered. The above mentioned method of entering data includes: a step of determining if the data input operation corresponding to the sensed data entered from the operation section is true or false; and a step of sending to an electronic instrument an output data corresponding to the sensed data only when the data input operation is determined as true. In the method described above, the step of determining if the data input operation corresponding to the sensed data entered from the operation section is true or false includes a process where if one or more of the sensed data are entered, a coordinate is identified which determines the data input operation as true based on an invalidation determination region information previously prepared for each of coordinates corresponding to the one or more of the sensed data, and where while the sensed data for the coordinate indentified is entered, either the data input operation, which is implemented to a coordinate other than the identified coordinate to determine the data input operation as true, is determined as false among a group aggregate of the coordinates corresponding to the sensed data within an invalidation determination region, or a sensitivity for outputting the sensed data is lowered with respect to the data input operation which is implemented to a coordinate other than the identified coordinate to determine the data input operation as true among the group aggregate of the coordinates corresponding to the sensed data within the invalidation determination region.

In order to achieve the above described object, according to a sixth aspect of the present invention, there is provided a method of entering data for a data input device for an electronic instrument, wherein the data input device includes: an operation section which includes a flat data input operation surface and an electrostatic capacitance type touch sensor to sense a data input operation implemented to the data input operation surface; and a control circuit section into which a sensed data of the data input operation sent from the operation section is entered. The above mentioned method of entering data includes: a step of determining if the data input operation corresponding to the sensed data entered from the operation section is true or false; and a step of sending to an electronic instrument an output data corresponding to the sensed data only when the data input operation is determined as true. In the method described above, the step of determining if the data input operation corresponding to the sensed data entered from the operation section is true or false includes a process where if one or more of the sensed data are entered, a coordinate is identified which determines the data input operation as true based on an invalidation determination region information previously prepared for each of coordinates corresponding to the one or more of the sensed data, and where while the sensed data for the coordinate indentified is entered, either the data input operation, which is implemented to a coordinate other than the identified coordinate to determine the data input operation as true, is determined as false among a group aggregate of the coordinates corresponding to the sensed data within an invalidation determination region, or a sensitivity for outputting the sensed data is lowered with respect to the data input operation which is implemented to a coordinate other than the identified coordinate to determine the data input operation as true among the group aggregate of the coordinates corresponding to the sensed data within the invalidation determination region, and at the same time where when the coordinate, which determines the data input operation as true, is identified, if the sensed data for a vertex coordinate corresponding to a position located farthest from an operator and also if a plurality of vertex coordinates to which the sensed data are entered are disposed adjacent to one another, the coordinate is identified which determines the data input operation as true based on a number of the plurality of vertex coordinates, a comparison data of sensed values of the sensed data corresponding to the plurality of vertex coordinates, and a duration time data of entering the sensed data corresponding to the plurality of vertex coordinates.

Thus, according to the present invention, the above described data input device for an electronic instrument, which is provided with electrostatic capacitance type touch sensors, is free from an incorrect entry and achieves an enhanced operability.

DETAILED DESCRIPTION OF THE INVENTION

An exemplary embodiment of the present invention will hereinafter be described with reference to the accompanying drawings.

Figure 1:
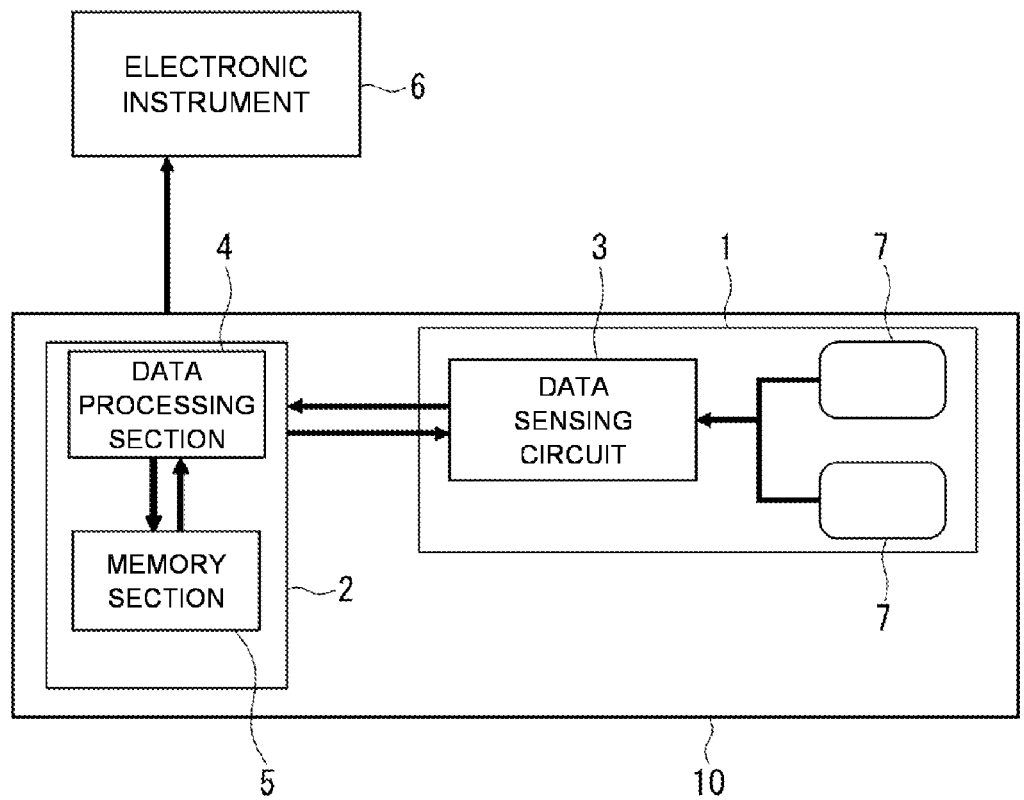
FIG. 1 is a functional block diagram of a relevant portion of a data input device according to an embodiment of the present invention.

Referring to FIG. 1, a data input device 10 according to an embodiment of the present invention is intended for use with an electronic instrument 6 and includes an operation section 1 which includes a flat data input operation surface 14 (not shown in FIG. 1; refer to FIG. 2) and electrostatic capacitance type touch sensors 7 to sense a data input operation implemented to the data input operation surface 14, and a control circuit section 2 into which a sensed data on the data input operation from the operation section 1 is entered. As will be described herein later, the control circuit section 2 is configured to determine if the data input operation is true or false and to send to the electronic instrument 6 an output data corresponding to the sensed data, only when the data input operation for which the sensed data is entered is determined as "true".

Figure 2:
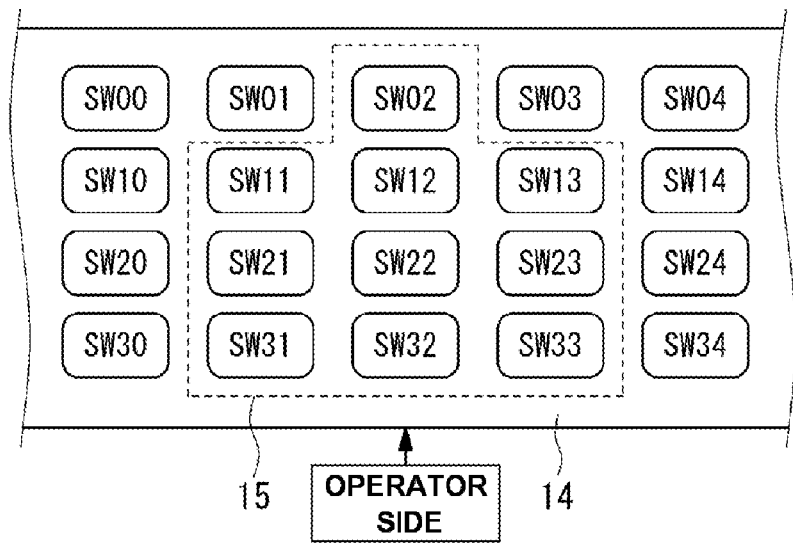
FIG. 2 is a schematic top plan view of an example of an invalidation determination region in the data input device according to the embodiment of the present invention.

Referring now to FIG. 2, in the data input device 10 according to the present embodiment, a plurality of segments SW00 to SW34 (hereinafter referred to simply as "key switches") are disposed on the data input operation surface 14, wherein the touch sensor 7 is provided at each of the key switches SW00 to SW34. For example, the touch sensor 7 may be set on a substrate provided beneath the data input operation surface 14 so as to be positioned immediately below each of the key switches SW00 to SW34.

The operator for the data input device 10 touches, with fingers or the like, the key switches SW00 to SW34 on the data input operation surface 14 thereby implementing the data input operation. The operation section 1 further includes, as shown in FIG. 1, a data sensing circuit 3 which, when the data input operation is implemented to the key switches SW00 to SW34, senses the variation of an electrostatic capacitance generated at the touch sensor 7 corresponding to a relevant key switch, and which then sends to the control circuit section 2 the sensed data indicating that the data input operation is executed.

Accordingly, in the case of the data input device 10, the position which is defined on the data input operation surface 14 and to which the data input operation is implemented corresponds concretely to each of the key switches SW00 to SW34, wherein the identification of the coordinates (for example, by way of integer combinations 00 to 34) means the identification of the key switches SW00 to SW34.

Also, in the data input device 10, a data for designating a key switch to which the data input operation is implemented is first sent from the control circuit section 2 to the data sensing circuit 3 which then sends to the control circuit section 2 a sensed data about the key switch designated by the data, whereby the control circuit section 2 identifies the key switch to which the data input operation was implemented corresponding to the sensed data sent from the operation section 1. As long as the control circuit section 2 is capable of identifying the position (for example, the key switch corresponding to the position) which is defined on the data input operation surface and to which the data input operation is implemented according to the sensed data sent from the operation section 1 to the control circuit section 2, the data input device according to the present invention can be configured arbitrarily in an appropriate manner.

Also, in the data input device 10, the sensed data sent from the data sensing circuit 3 to the control circuit section 2 contains, not only the data which designates whether or not the data input operation is implemented to the key switch, but also the data about a determined value itself which is sent from the touch sensor 7 to the data sensing circuit 3, (undergoes an appropriate process, when needed), and which is then compared with a threshold value provided at the data sensing circuit 3 thereby determining whether or not the data input operation is implemented.

In the data input device 10, the control circuit section 2 includes a data processing section 4 and a memory section 5 as its functional blocks (refer to FIG. 1). The functions of the functional blocks and the method of entering data in the data input device 10 according to the present embodiment will be described.

Prior to explaining steps shown in the flow chart of FIG. 3, an explanation will be made of data stored in the memory section 5 of the data input device 10. In the memory section 5, information whether or not there exists a sensed data for the coordinate of the position which is defined on the data input operation surface 14 and to which the data input operation is implemented (that is, in the case of the present embodiment, a sensed data for each key switch) is stored with respect to each coordinate (that is, in the case of the present embodiment, with respect to each key switch). This is schematically represented, for example, as Tables 2 and 4 corresponding respectively to Steps S2 and S4 in the flow chart of FIG. 3.

For example, in Table 2 which corresponds to Step S2 in FIG. 3, each key switch is specified by a combination of (X, Y), and a numerical value of 1 shown in Table 2 indicates that a sensed data corresponding to a relevant key switch is entered into the control circuit section 2 (that is to say, it is determined that the data input operation to the relevant key switch is duly executed in the data sensing circuit 3), and this state is hereinafter referred to also as key switch "ON state" as appropriate.

On the other hand, a numerical number of 0 indicates that a sensed data corresponding to a relevant key switch is not entered into the control circuit section 2, and this state is hereinafter referred to also as key switch "OFF state" as appropriate. Specifically, Table 2 indicates that the memory section 5 stores information that a key switch corresponding to a coordinate (1, 2) (the key switch is hereinafter identified with SW12, thus the key switch SW12, and this identification method is applied to other key switches in the same manner) and the key switch SW23 are in the "ON state" while the other key switches are in the "OFF state".

Further, the memory section 5 of the control circuit section 2 also stores invalidation determination region information (details thereof will be described later) which is previously prepared for each coordinate of the position to which the data input operation is implemented (that is, in the case of the present embodiment, each key switch). As will be described herein later, the data input device 10 of the present embodiment is primarily featured in that the control circuit section 2 functions to perform true-or-false determination of the data input operation, not simply based on the above described ON/OFF state, but further based on the invalidation determination region information.

Description will hereinafter be made of each step shown in the flow chart of FIG. 3. In the data input device 10, the data processing section 4 determines whether or not a sensed data for a key switch is newly entered from the operation section 1 (Step S1), and if not entered (No), the procedure is terminated. If the key switch is sensed (that is to say, if a sensed data for a key switch is newly entered) (Yes) at Step 1, the data processing section 4 stores a numerical value of 1 as a status of the key switch in a relevant place of the memory section 5, and then retrieves a vertex key of a group aggregate from the data which is stored in the memory section 5 and which corresponds to Table 2 (Step S2).

Figure 3:
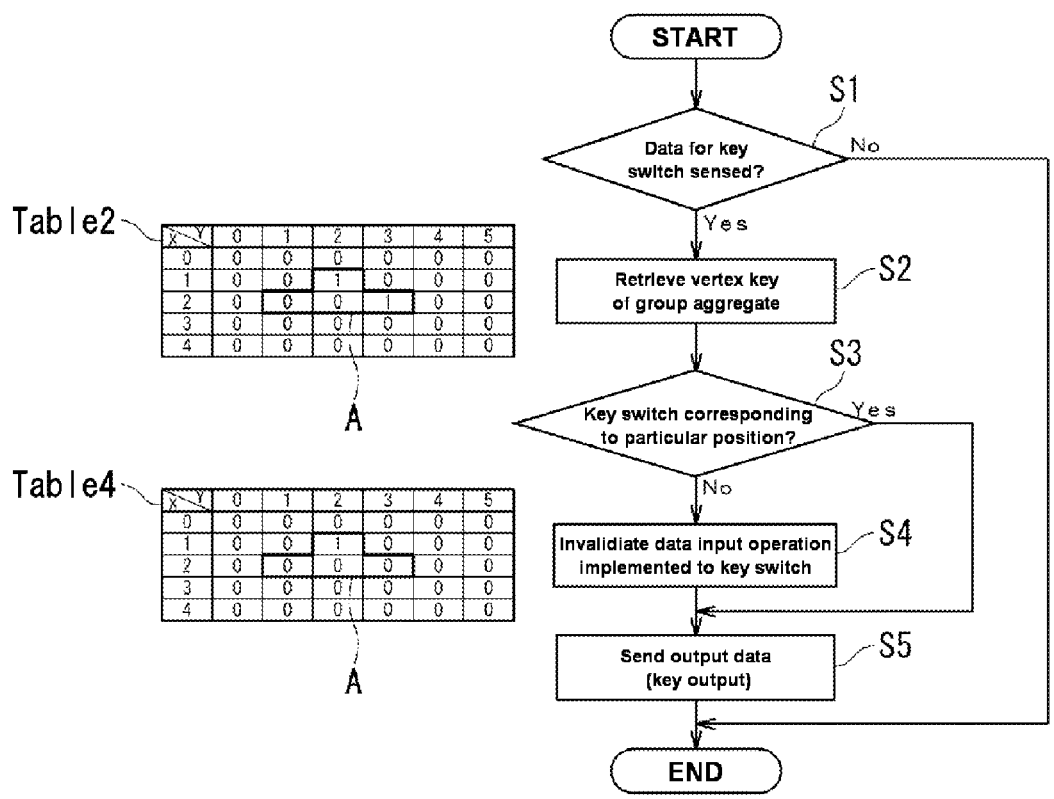
FIG. 3 is a flow chart of an example of a procedure for a true-or-false determination of a data input operation within the invalidation determination region for a function of the data input device and a method of entering data according to the embodiment of the present invention.

In the example shown in FIG. 3, it is assumed that the key switch SW23 is sensed at Step S1. Also, the group aggregate is an aggregate of key switches for which a numerical value of 1 is stored in the data of the memory section 5 corresponding to Table 2. Further, a key switch for which the data input operation is determined as "true" in a specific invalidation determination region is defined as "vertex key". Here, Step S2 at which a vertex key of a group aggregate is retrieved is described in other words as a process where an invalidation determination region in which a numerical number 1 is stored for a vertex key in the data of the memory section 5 corresponding to Table 2 and also the vertex key are retrieved from a plurality of invalidation determination regions including the key switch SW23.

In the example, as shown in Table 2, the key switch SW12 is sensed as a vertex key, wherein an invalidation determination region A includes the key switches SW12, SW21, SW22 and SW23. In order to perform such a retrieval, data for defining an invalidation determination region for each of all key switches (for example, data for specifying a key switch included in the invalidation determination region) are stored in the memory section 5 as invalidation determination region information.

Then, the data processing section 4 determines whether or not a key switch corresponding to a particular position is included in the group aggregate within the invalidation determination region A for the vertex key SW12 retrieved in Step S2 (Step S3). If, no key switch corresponding to the particular position is included (No), the data processing section 4 determines that a data input operation implemented to any key switch (in this case, the key switch SW23) other than the vertex key SW12 for which the data input operation is determined as "true" is false, and the data input operation implemented to the key switch is invalidated (Step S4). That is to say, as shown in Table 4, the data processing section 4 stores a numerical value of 0 at a place in the data of the memory section 5 corresponding to the key switch (SW23) for which the data input operation is invalidated.

Then, the data processing section 4 sends an output data (key output) for the electronic instrument 6 according to the ON/OFF state of each key switch stored in the memory section 5 (Step S5). In the case of the example, since the data input operation for the key switch SW23 is determined as "false" at Step S4 and the key switch SW23 is stored as "OFF" state in the memory section 5, an output data for the key switch SW23 is not sent out.

Also, if it is determined at Step S3 that a key switch corresponding to a particular place is included in the group aggregate within the invalidation determination region A for the vertex key SW12 retrieved at Step S2 (Yes), the data input operation for the key switch corresponding to the particular position is not determined as "false", and the data entry procedure moves on directly to Step S5. From the standpoint of the definition of invalidation determination region, an arbitrary invalidation determination region is defined as not including a key switch corresponding to a particular position except when a key switch corresponding to a particular position is included as a vertex key.

Included among a key switch preferably defined as corresponding to a particular position are a Ctrl key, an Alt key, a Shift key, Fn key, and the like, which are intended for use in, for example, a keyboard for a personal computer, and which are defined to perform a special function when a data input operation is implemented simultaneously to both such a key and a key switch other than the key.

Referring again to FIG. 2, description will be made of a preferred example of invalidation determination region. FIG. 2 shows, as an example, an invalidation determination region 15 for which the key switch SW02 is defined as vertex key. In the invalidation determination region 15, the key switch SW02 which is located farthest from the operator is defined as vertex key, and the data input operation implemented to the key switch SW02 is determined as "true" in the invalidation determination region 15.

The invalidation determination region 15 described above is defined in consideration of the situation that when the operator uses the data input device 10, especially in such a manner that the operator uses a plurality of fingers of the both hands to implement the data input operation from the operator side of the data input operation surface 14 (for example, with the wrists fixed at the front of the data input operation surface 14), an incorrect data entry tends to occur at the key switch group (hereinafter referred to also as invalidation determination candidate key) made up of the key switches SW11 to SW13, SW21 to SW23, and SW31 to SW33 which are located closer to the operator than the key switch SW02 to which the operator implements an intentional data input operation and so which is defined as vertex key. That is to say, the invalidation determination region 15 is defined to include a vertex key and invalidation determination candidate keys.

It is assumed that the invalidation determination region A shown in Tables 2 and 4 of FIG. 3, in which the key switch SW12 is designated as vertex key, is set based on the same engineering philosophy that is used for setting the invalidation determination region 15 shown in FIG. 2. In this connection, the invalidation determination region A has a geometry similar to the geometry of the invalidation determination region 15 shown in FIG. 2, but this is simply for the convenience of explanation, and it is obvious that the invalidation determination region A, which is a bit sequence pattern of the data in the memory section 5, does not necessarily have to have a geometry corresponding to the geometry of the invalidation determination region 15 defined on the data input operation surface 14.

Also, the definition of the invalidation determination region 15 shown in FIG. 2 is described only as one preferred example, and in the present invention, the geometry and scope of the invalidation determination region as well as the position of the vertex key may be appropriately defined according to the actual situation where an incorrect data entry occurs.

Thus, according to the data input device 10 and the method of entering data according to the present embodiment, a false data input operation can be effectively determined, and the operability of a highly sensitive data input device incorporating an electrostatic capacitance type touch sensor can be enhanced. Moreover, in the data input device 10 and the method of entering data according to the present embodiment, the data input operation implemented by the operator intentionally to two or more key switches at the same time can be determined as "true".

For example, in the case of the invalidation determination region A shown in Table 2 of FIG. 3, even if key switches other than the key switches SW12, SW13 and SW14 are in the ON state when a data input operation is implemented to the key switch SW23, it does not happen that the data input operation implemented to the key switch SW23 is determined as "false". As a result, especially in the case of a data input device (for example, a keyboard for a personal computer) in which a relatively large number of key switches are provided on a data input operation surface and in which the operator is supposed to enter data at a high speed, for example, by using a plurality of fingers of the both hands, the operability can be significantly enhanced.

The data input device 10 according to the present embodiment of method of entering data will be described with reference to FIG. 4. Since Steps S11, S12, S13, S17 and S18 shown in FIG. 4 are the same as Steps S1, S2, S3, S4 and S5, respectively, the duplicate explanation thereof will be omitted, and description will be focused on the difference, specifically Steps S14, S15 and S16.

Figure 4:
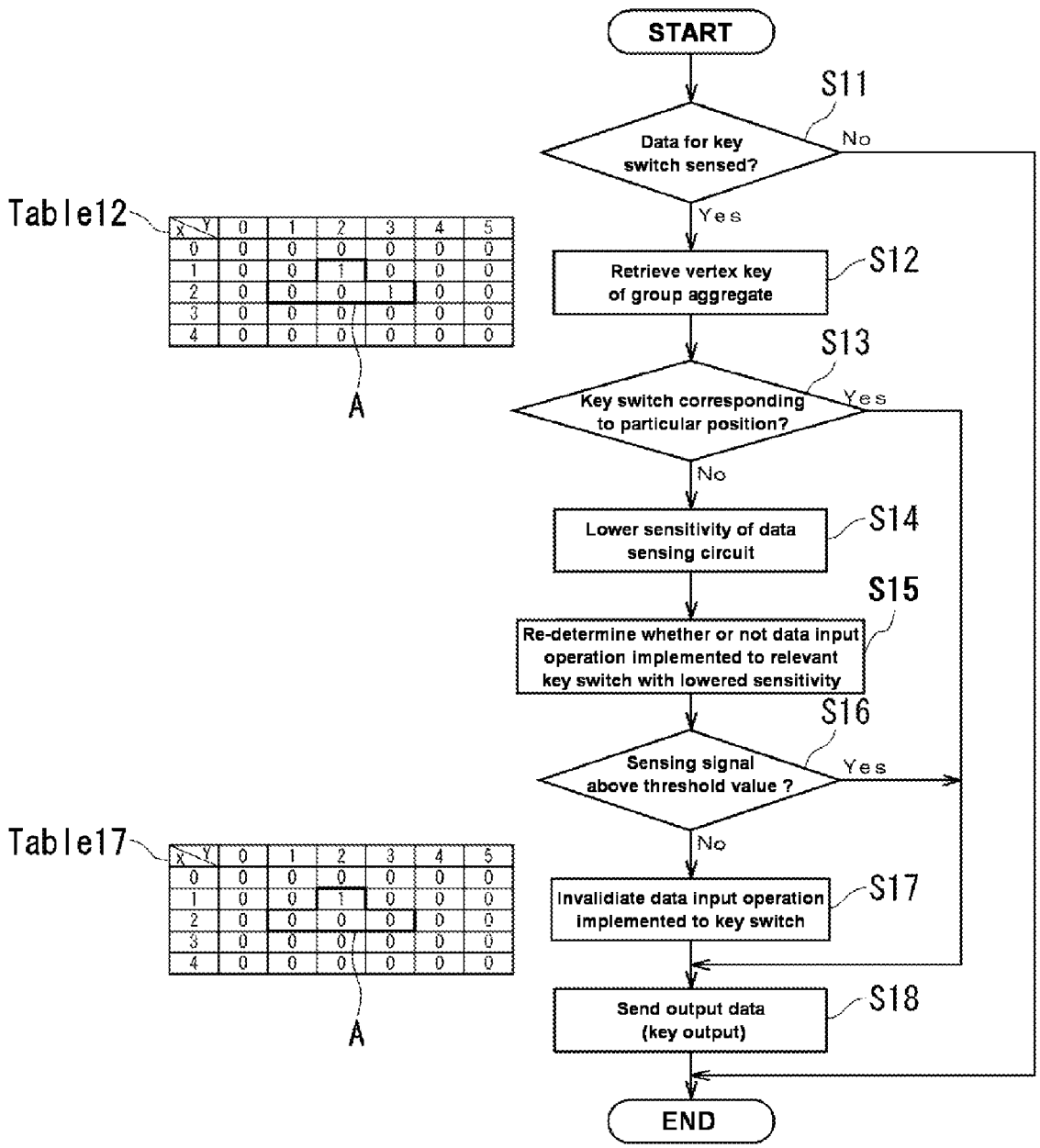
FIG. 4 is a flow chart of an example of a procedure for a true-or-false determination of a data input operation within the invalidation determination region for the function of the data input device and the method of entering data according to the embodiment of the present invention.

When each step shown in FIG. 4 is performed, the data sensing circuit 3 of the operation section 1 in the data input device 10 of FIG. 1 is assumed to have an adjustable sensitivity for sending out the sensed data corresponding to the data input operation according to the command from the control circuit section 2 (for example, the data processing section 4). For example, the data sensing circuit 3 includes a amplification means (not shown) for amplifying a sensing signal from the touch sensor 7 and a comparison means (not shown) for comparing the sensing signal amplified with a prescribed threshold value, wherein the data sensing circuit 3 is adapted to send out a sensed data to the control circuit section 2 when the sensing signal amplified is equal to or above the prescribed threshold value.

In this case, the sensitivity of the data sensing circuit 3 can be adjusted by changing the relative relation between the sensing signal amplified and the prescribed threshold value level. For example, the sensitivity can be lowered by decreasing the amplification factor of the amplification means while the level of the threshold value is maintained, or by increasing the level of the threshold value while the amplification factor of the amplification means is maintained.

The flow chart of FIG. 4 shows that if it is determined at Step S13 that a key switch corresponding to a particular position is not included among the group aggregate in the invalidation determination region A for the vertex key SW12 retrieved at Step S12 (No), the data processing section 4 lowers the sensitivity of the data sensing circuit 3 (Step S14). Then, the data sensing circuit 3 re-determines with a lowered sensitivity whether or not the data input operation is implemented to a relevant key switch (the key switch SW23 in the case of the present example) among the group aggregate in the invalidation determination region A for the vertex key SW12 according to the command from, for example, the data processing section 4 (Step S15).

And, if the sensing signal amplified is below the threshold value at the data sensing circuit 3 (No at Step S16) and therefore the sensed data corresponding to the data input operation for the key switch SW23 is not re-entered into the control circuit section 2, the data processing section 4 determines at Step S17 that the data input operation for the key switch SW12 is false.

On the other hand, if the sensing signal amplified is equal to or above the threshold value at the data sensing circuit 3 (Yes at Step S16) and therefore the sensed data corresponding to the data input operation for the key switch SW23 is re-entered into the control circuit section 2, the data input operation for the key switch SW12 is not determined as "false" and the entry procedure moves on directly to Step S18.

Thus, in the example shown in the flow chart of FIG. 4, the data input operation implemented by the operator intentionally to two or more key switches at the same time can be further accurately distinguished from an incorrect data entry by appropriately setting the sensitivity of the data sensing circuit 3.

As described above, the method of determining an incorrect data entry by means of the invalidation determination regions is effective in preventing an incorrect data entry that may possibly occur at a key switch group located closer to the operator than the key switch to which the operator intends to enter data.

An incorrect data entry that may possibly occur at a place between key switches located adjacent to each other and arrayed laterally with respect to the operator can be prevented by the method to be described below, whereby, especially in the case of a data input device (for example, a keyboard for a personal computer) in which a relatively large number of key switches are provided on a data input operation surface and in which the operator is supposed to enter data at a high speed, for example, by using a plurality of fingers of the both hands, the operability can be significantly enhanced.

The abovementioned event will be described in detail with reference to FIG. 12 as follows. In the case of two adjacent key switches arrayed laterally with respect to the operator, even when the operator puts the fingers, or the like on the data input operation surface intending to implement a data input operation to one (for example, the key switch SW02) of two key switches, it can happen that a sensed data indicating the ON state also for the other key switch (for example, the key switch SW01) is generated due to the fingers placed off position.

Figure 12:
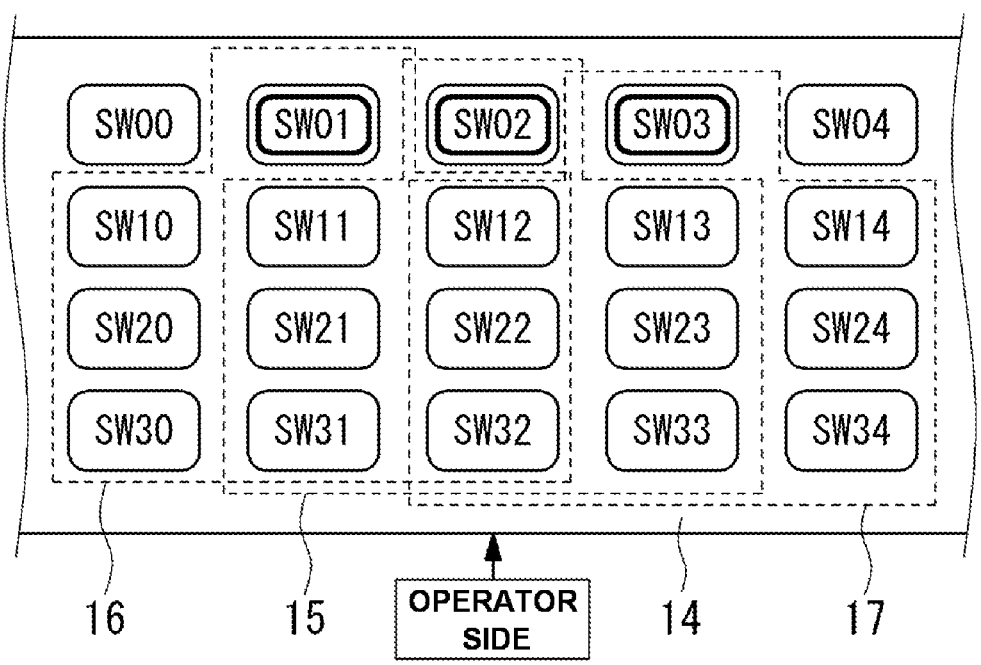
FIG. 12 is a schematic top plan view of an example of three invalidation determination regions which are located adjacent to each other in the data input device according to the embodiment of the present invention.

However, in the method of determining an incorrect data entry by means of an invalidation determination region as shown in FIG. 12, when sensed data are generated at the same time which indicate the ON state for both of the key switches SW02 and SW01 which are respective vertex keys of an invalidation determination regions 15 and 16, the data input operations implemented to the key switches SW01 and SW02 are both determined as "true".

In a data input device provided with an electrostatic capacitance type touch sensor, it is desirable that an incorrect data entry associated with two adjacent key switches disposed laterally with respect to the operator can be prevented. Further, in order to prevent such an incorrect data entry while maintaining the operability of the data input device, it is desirable that a sensed data resulting from a data input operation intentionally implemented by an operator can be distinguished on a basis of appropriate criteria from a sensed data resulting irrespective of the intention of the operator when sensed data are generated which indicate that the ON state to two (or more) key switches.

As described above, in the data input device 10, an invalidation determination region is previously defined with respect to each key switch, wherein the data input device 10 is featured in that a data input operation in each invalidation determination region is determined as "true/false" by means of the invalidation determination region.

Specifically, the invalidation determination region is defined to include a key switch (hereinafter referred to also as a vertex key, which corresponding to a vertex coordinate in the present embodiment) which is located farthest from the operator, and also a key switch group (hereinafter referred to also as invalidation candidate key) which is located on the near side of the vertex key. For example, FIG. 5 shows the invalidation determination regions 16 and 15 in which the key switches SW01 and SW02 are defined as respective vertex keys.

Detailed description will follow below. The invalidation determination region 15 shown in FIG. 5 is defined in consideration of the situation that when the operator uses the data input device 10, especially in such a manner that the operator uses a plurality of fingers of the both hands to implement the data input operation from the operator side of the data input operation surface 14 (for example, with the wrists fixed at the front of the data input operation surface 14), an incorrect data entry tends to occur at the key switch group (hereinafter, referred to also as invalidation determination candidate key) made up of the key switches SW11 to SW13, SW21 to SW23, and SW31 to SW33 which are closer to the operator than the key switch SW02 to which the operator implements an intentional data input operation and so which is defined as vertex key.

Figure 5:
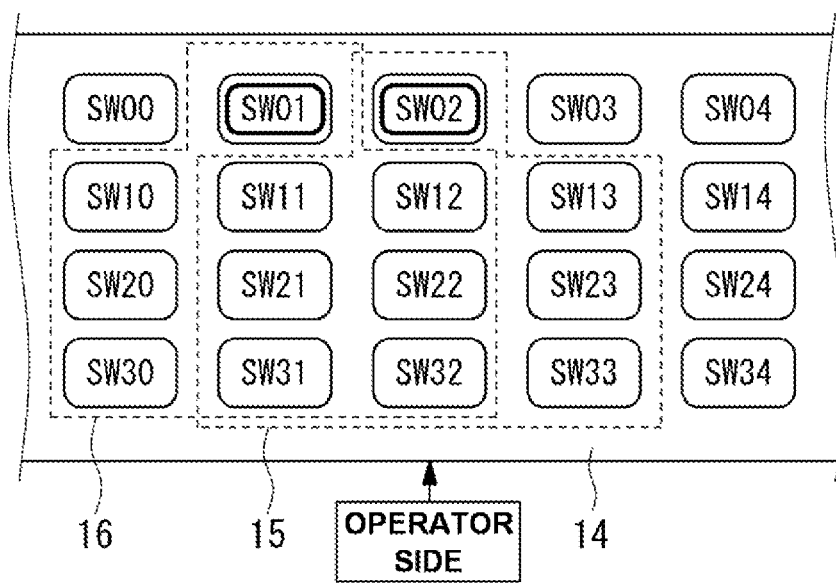
FIG. 5 is a schematic top plan view of an example of two invalidation determination regions which are located adjacent to each other in the data input device according to the embodiment of the present invention.

It is assumed that the invalidation determination region A shown in Tables 2 and 4 of FIG. 3, in which the key switch SW12 is designated as vertex key, is set based on the same engineering philosophy that is used for setting the invalidation determination regions 15 and 16 shown in FIG. 5. In this connection, the invalidation determination region A has a geometry similar the geometry of the invalidation determination region 15 shown in FIG. 5, but this is simply for the convenience of explanation, and it is obvious that the invalidation determination region A, which is a bit sequence pattern of the data in the memory section 5, does not necessarily have to have a geometry corresponding to the geometry of the invalidation determination region 15 defined on the data input operation surface 14.

Also, the definition of the invalidation determination regions 15 and 16 shown in FIG. 5 is described only as one preferred example, and in the present invention, as long as the key switch located farthest from the operator is defined as vertex key, the geometry and scope of the invalidation determination region may be appropriately defined according to the actual situation where an incorrect data entry occurs.

Figure 6:
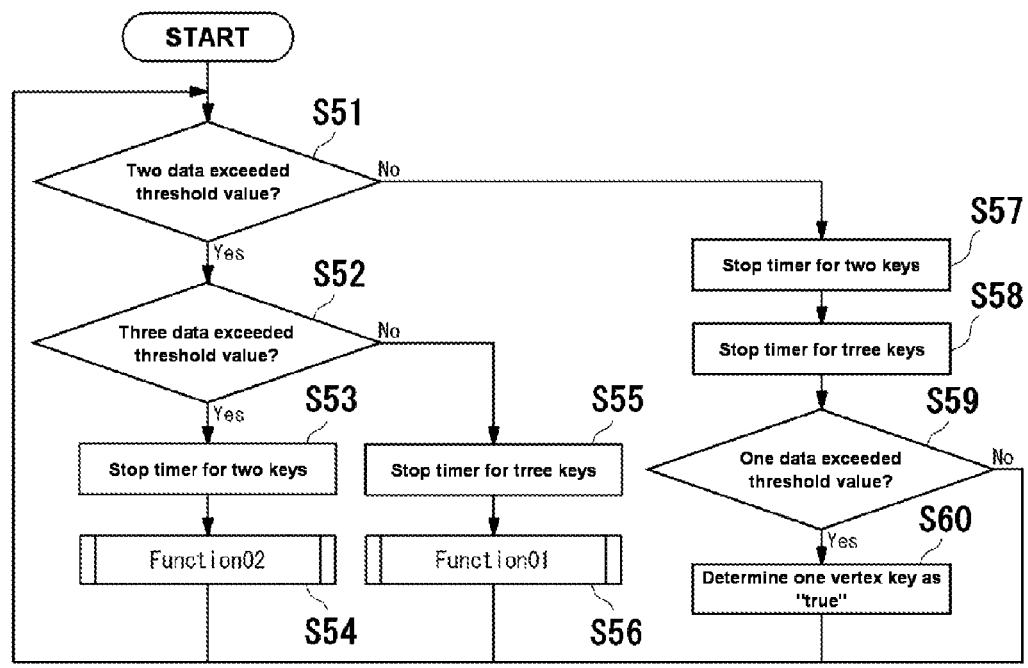
FIG. 6 is a flow chart of an example of a true-or-false determination procedure for a data input operation with respect to a vertex key of the invalidation determination region for the function of the data input device and the method of entering data according to the embodiment of the present invention.
Figure 7:
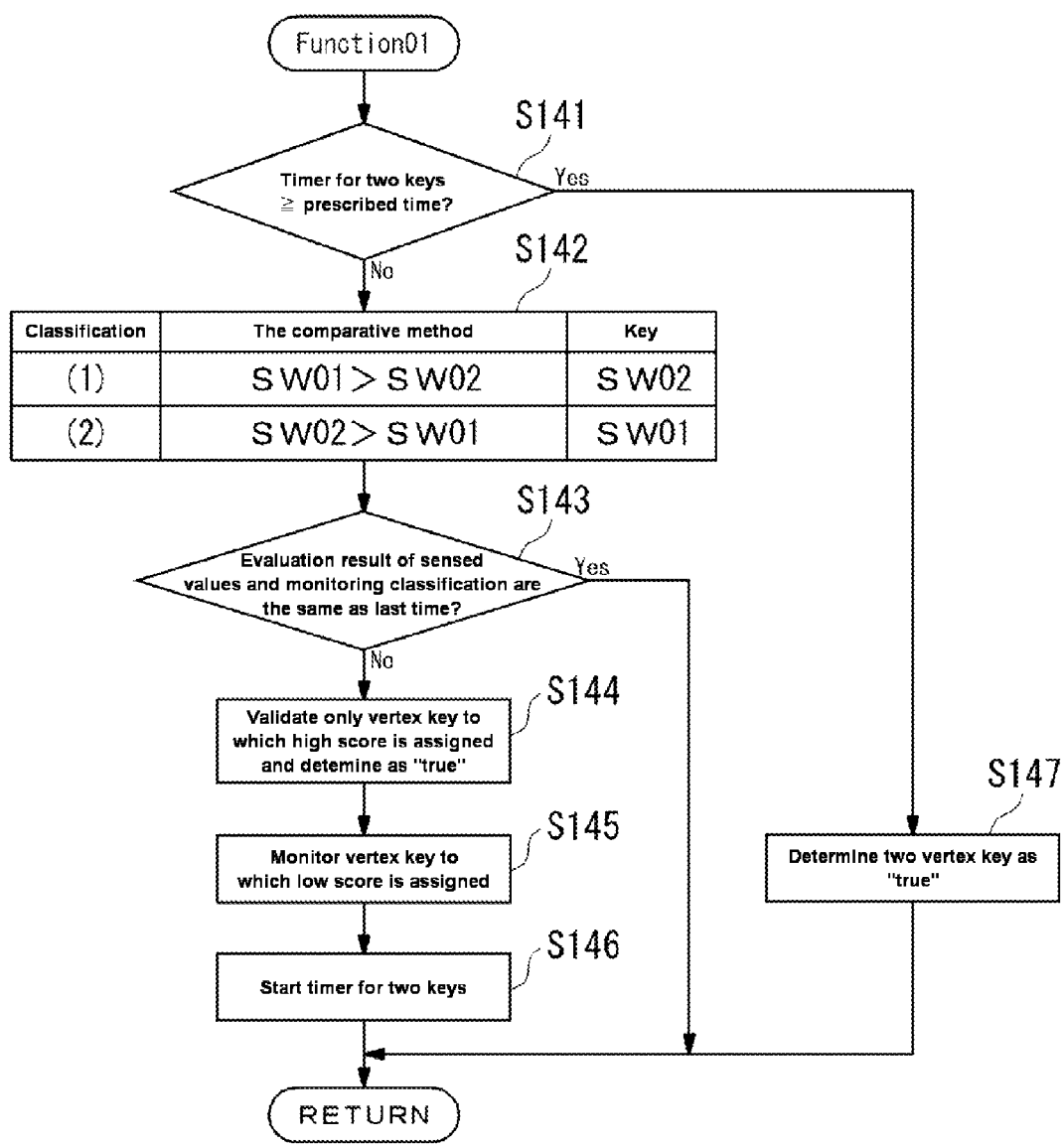
FIG. 7 is a flow chart of details of a true-or-false determination procedure in a case when sensed data are entered for two vertex keys in the flow chart of FIG. 6.
Figure 8:
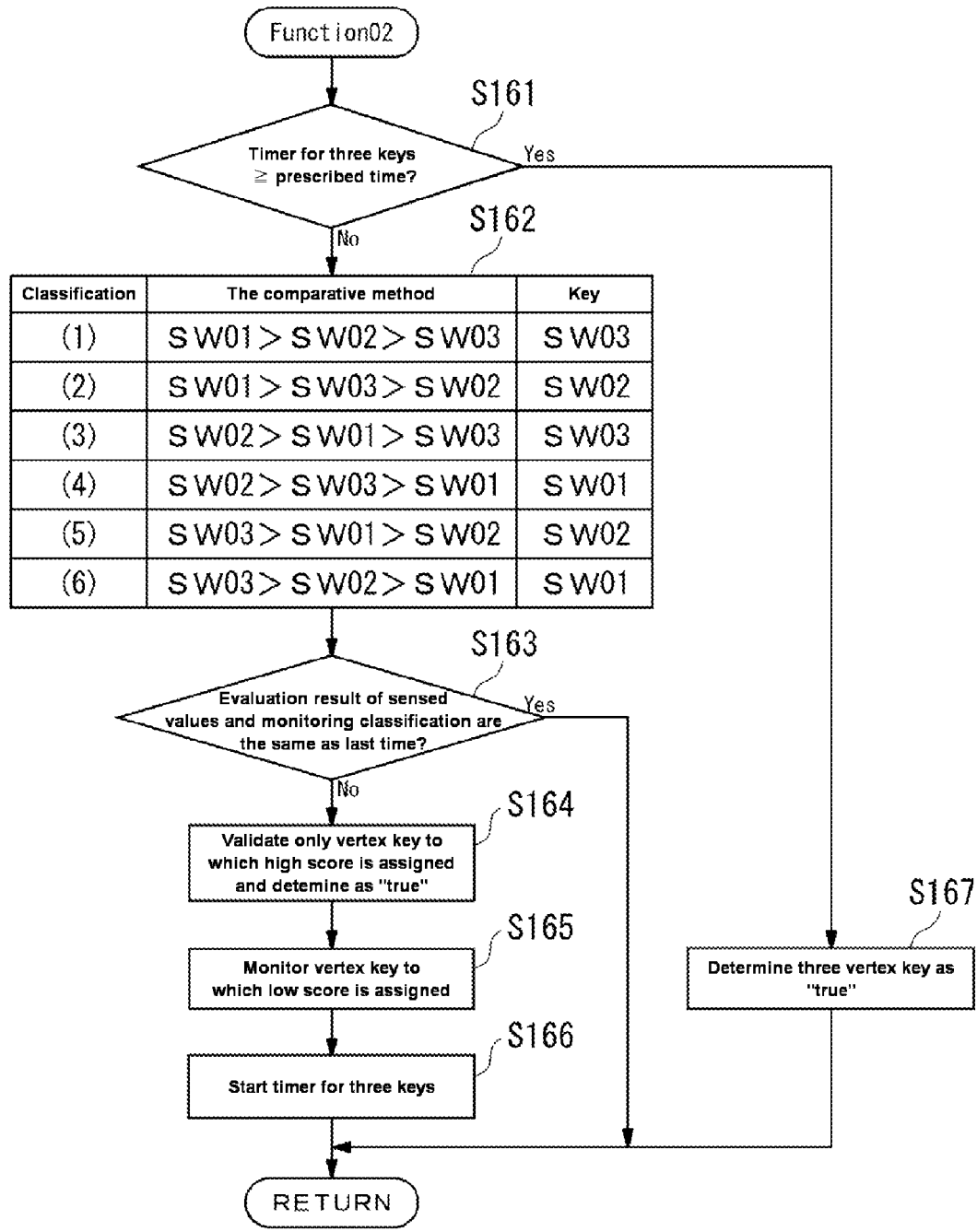
FIG. 8 is a flow chart of details of a true-or-false determination procedure in a case when sensed data are entered for three vertex keys in the flow chart of FIG. 6.

Thus, the data input device 10 is further featured in that when the sensed data of the data input operation for a plurality of vertex keys (for example, the key switches SW01 and SW02) located adjacent to each other and arrayed laterally with respect to the operator are entered into the control circuit section 2, the sensed data of the data input operation can be determined as "true/false". With reference to FIGS. 6 to 8, description will be made of the true-or-false determination of the data input operation for the plurality of vertex keys which are arrayed adjacent to one another and to which the sensed data are entered.

Referring to FIG. 6, the data processing section 4 determines whether or not two or more of vertex keys exist with respect to which the sensed data is entered into the control circuit 2 (that is to say, the sensed value of the touch sensor 7 exceeds the threshold value at the data sensing circuit 3) and also which are located adjacent to each other and arrayed laterally with respect to the operator (Step S51). If there do not exist two or more of the vertex keys that meet such requirements (No), a timer for two keys (to be described later) is stopped (Step S57), and then a timer for three keys (to be described later) is stopped (Step S58).

Then, the data processing section 4 determines at Step S59 whether or not there exists one vertex key for which the sensed data is entered, wherein if such a vertex key exists (Yes), the data input operation for the vertex key is determined as "true" at Step S60, the processing procedure moves back to Step S51 (after executing the necessary processing, such as storage of the relevant ON state into the memory section 5, see Tables 2 and 4 shown in FIG. 3), and wherein if it is determined that there exists no vertex key for which the sensed data is entered (No), the processing procedure moves back directly to Step S51.

On the other hand, if it is determined at Step S51 that there exist two or more of the vertex keys that meet the requirements described above (Yes), the data processing section 4 further determines whether or not there exist three of the vertex keys that meet the above requirements (Step S52), wherein if it is determined that there do not exist three of the vertex keys (No), the aforementioned timer for three keys (to be detailed later) is stopped (Step S55), and a processing (Function 01) is executed which is applied to the situation where two adjacent vertex keys exist for which the sensed data is entered (Step S56).

After Function 01 is completed, the processing procedure moves back to Step S51. And, if it is determined at Step S52 that there exist three of the vertex keys which meet the above requirements (Yes), the aforementioned timer for two keys (to be detailed later) is stopped (Step S53), and a processing (Function 02) is executed which is applied to the situation where three adjacent vertex keys exist for which the sensed data is entered (Step S54). After Function 02 is completed, the processing procedure moves back to Step S51.

The processing procedure of Function 01 will be described with reference to FIG. 7, where the key switches SW01 and SW02 are the two vertex keys that meet the above requirements. The data processing section 4 determines whether or not a data entry duration time (to be detailed later) measured by the timer for two keys is equal to or above a prescribed time (Step S141), wherein if the data entry duration time is below the prescribed time (No), the sensed values (that is, signal values to be compared with the threshold value at the data sensing circuit 3) of the two vertex keys SW01 and SW02 is evaluated (Step S142).

Figure 9A:
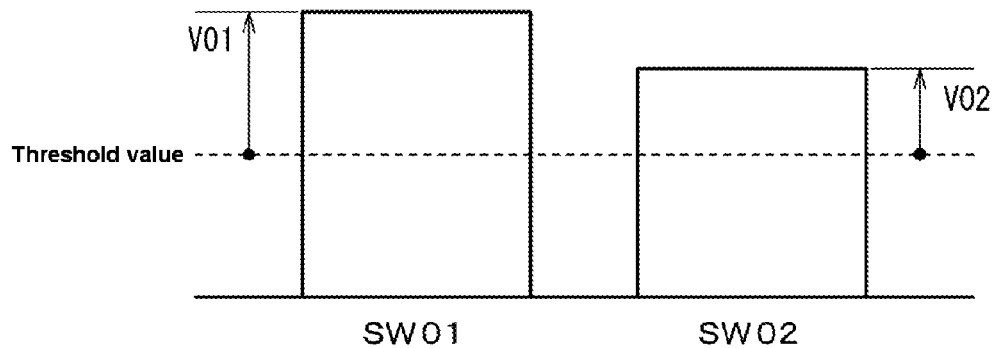
FIG. 9A is a chart of a first example of a method of evaluating a sensed value of a sensed data for vertex keys of the invalidation determination regions located adjacent to each other for the function of the data input device and the method of entering data according to the embodiment of the present invention.

Examples of evaluations will be described with reference to FIGS. 9A to 9D below. FIG. 9A shows an example of evaluation where the sensed values of the two vertex keys SW01 and SW02 are evaluated by comparison between difference values V01 and V02, which are given by differences between the sensed values of the two vertex keys SW01 and SW02 and the threshold value common to the two vertex keys SW01 and SW02. In the case of this example, as the sensed value comparison information, a high score is assigned to the vertex key (for example, the key switch SW01) with which a larger value (the difference value V01) is associated while a low score is assigned to the vertex key (for example, the key switch SW02) with which a smaller value (the difference value V02) is associated.

Figure 9B:
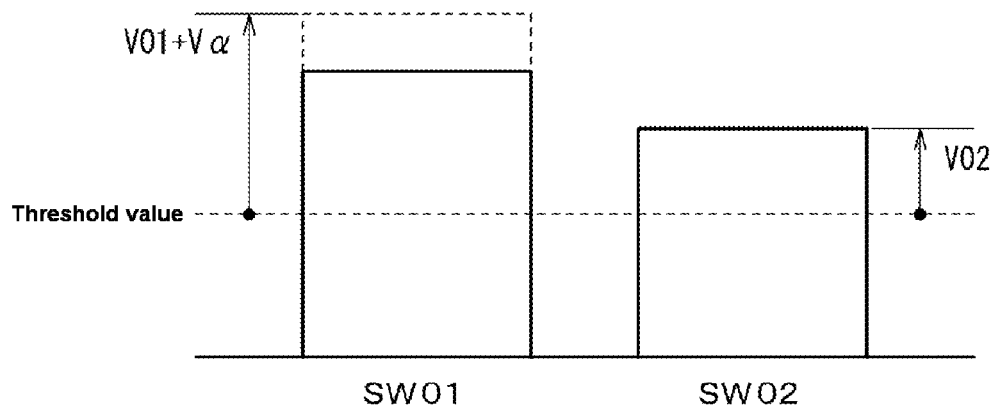
FIG. 9B is a chart of a second example of a method of evaluating a sensed value of a sensed data for vertex keys of the invalidation determination regions located adjacent to each other for the function of the data input device and the method of entering data according to the embodiment of the present invention.

FIG. 9B shows an example of evaluation, where the difference values V01 and V02 are compared as a tentative step, a prescribed value $V\alpha$ is added to a larger difference value (the difference value V01) thereby giving a value $V01+V\alpha$, then the value $V01+V\alpha$ and the difference value V02 are compared, and, as the sensed value comparison information, a high score is assigned to the vertex key (for example, the key switch SW01) with which a larger value (the value $V01+V\alpha$) is associated while a low score is assigned to the vertex key (for example, the key switch SW02) with which a smaller value (the value V02) is associated.

The evaluation method shown in FIG. 9B is preferred for prevention of chattering and may be modified wherein a prescribed value is deducted from a smaller difference value determined at the tentative step, and a value resulting from the reduction is compared with a larger difference value, or alternatively wherein a larger difference value determined at the tentative step is multiplied by a prescribed factor given in accordance with the larger difference value (or a smaller difference value determined at the tentative step is divided by a prescribed factor given in accordance with the smaller difference value), whereby the evaluation is performed.

Further, in the sensed value evaluations shown in FIGS. 9A and 9B, the absolute value of the sensed value, instead of the difference value between the sensed value and the common threshold value, may alternatively be applied.

Figure 9C:
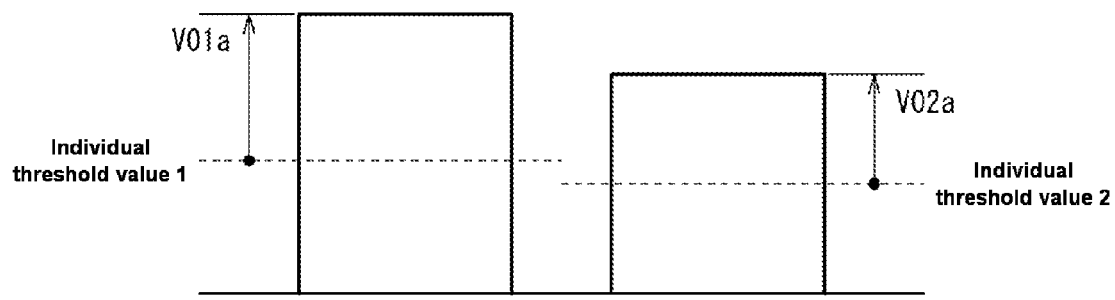
FIG. 9C is a chart of a third example of a method of evaluating a sensed value of a sensed data for vertex keys of the invalidation determination regions located adjacent to each other for the function of the data input device and the method of entering data according to the embodiment of the present invention.
Figure 9D:
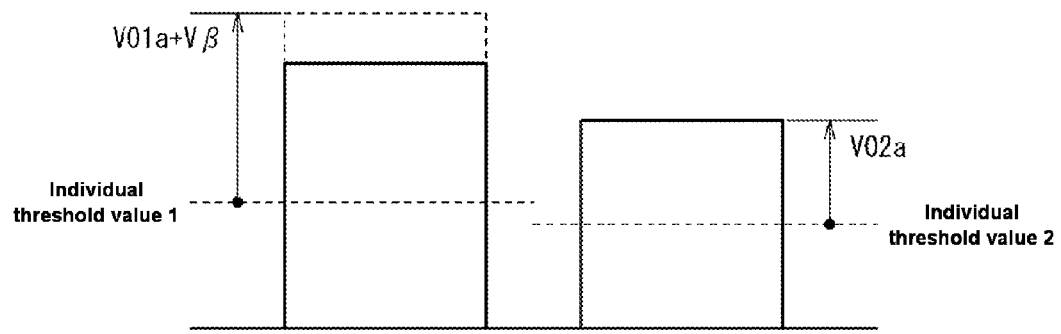
FIG. 9D is a chart of a fourth example of a method of evaluating a sensed value of a sensed data for vertex keys of the invalidation determination regions located adjacent to each other for the function of the data input device and the method of entering data according to the embodiment of the present invention.

Also, in the data input device 10, the key switches may be provided with respective individual threshold values according to the design specification of the data input operation surface 14 and/or according to the function of each key switch. FIGS. 9C and 9D show examples of evaluations where the vertex keys SW01 and SW02 are provided with respective different threshold values.

In the evaluation methods shown in FIGS. 9C and 9D, the vertex keys SW01 and SW02 have difference values V01*a* and V02*a*, respectively, which are given by comparison between the sensed values and their respective individual threshold values. Otherwise, the evaluation methods shown in FIGS. 9A and 9B are the same as the methods shown in FIGS. 9A and 9B, respectively.

Then, the data processing section 4 determines whether or not the evaluation result on the sensed values and the monitoring classification, which are obtained at Step S142, are the same as the last time (Step S143), wherein if it is determined as "not the same" (No), only the vertex key to which a high score is assigned at Step S142 shall be valid and is determined as "true" (Step S144) while the vertex key to which a low score is assigned is set to be monitored (Step S145).

Subsequently, the data processing section 4 brings the timer for two keys into action (Step S146), and then the processing procedure returns to the earlier described procedure shown in FIG. 6. In the case of this example, when the monitoring classification falls into Category (1) at Step S142, the vertex key SW01 is determined as "true" and the vertex key SW02 is set to be monitored at Steps S144 and S155.

On the other hand, when the monitoring classification falls into Category (2) shown at Step S142, the vertex key SW02 is determined as "true" and the vertex key SW01 is set to be monitored. And, the necessary processing operation, such as storage of the relevant ON state into the memory section 5 (see Tables 2 and 4 shown in FIG. 3), is executed to the vertex key which is determined as "true" based on the sensed value comparison information resulting from the evaluation of the sensed values at Step S142.

Also, if the data entry duration time measured by the timer for two keys is equal to or above a prescribed time (Yes) at Step S141, the data processing section 4 determines that both of the two vertex keys SW01 and SW02 for which the sensed data are entered into the control circuit section 2 shall be valid and are determined as "true" (Step S147), and (after executing the necessary processing operation) the processing procedure returns to the procedure shown in FIG. 6.

On the other hand, if it is determined at Step S143 that the evaluation result on the sensed values and the monitoring classification, which are obtained at Step S142, are the same as the last time (Yes), the processing procedure returns to the procedure shown in FIG. 6.

Figure 10A:
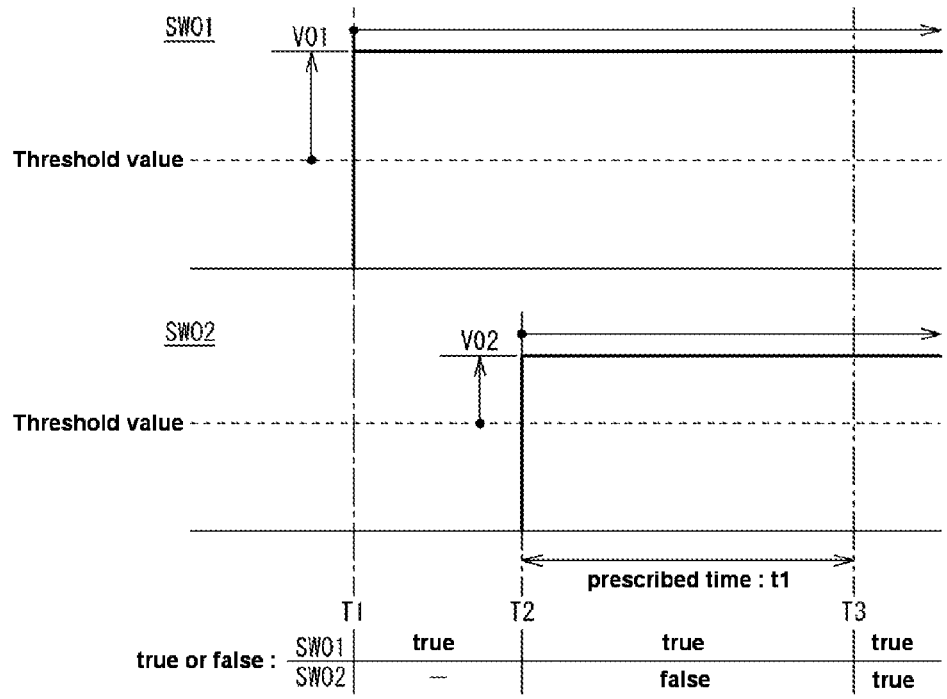
FIG. 10A is a chart of a first example of a method of determining a duration time of data entry for vertex keys of the invalidation determination regions located adjacent to each other for the function of the data input device and the method of entering data according to the embodiment of the present invention.
Figure 10B:
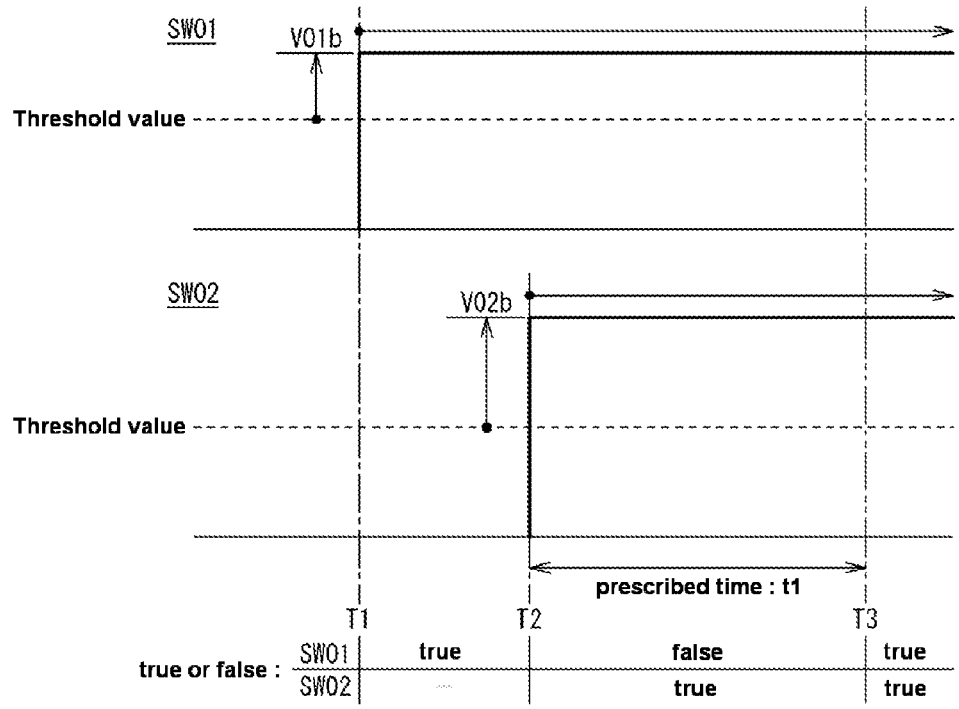
FIG. 10B is a chart of a second example of a method of determining a duration time of data entry for vertex keys of the invalidation determination regions located adjacent to each other for the function of the data input device and the method of entering data according to the embodiment of the present invention.

Detailed description will be made, with reference FIGS. 10A and 10B, of a "true-or-false" determination of two vertex keys on a basis of data entry duration time. FIGS. 10A and 10B are time charts for sensed values in which a data input operation is implemented to the two vertex keys SW01 and SW02 almost at the same time.

Referring to FIG. 10A, a sensed value exceeding a threshold value (so as to render a difference value V01) is generated for the vertex key SW01 at Time T1, and afterward a sensed value exceeding the threshold value (so as to render a difference value V02 which is smaller than the difference value V01) is generated for the vertex key SW02 at Time T2.

Consequently, at a time period between Times T1 and T2, the sensed data only for the vertex key SW01 is entered into the control circuit section 2, and the data processing section 4, after performing determination at Step S51 of the processing procedure shown in FIG. 6, performs the procedure of Steps S57 to S60 and determines the vertex key SW01 as "true".

When the sensed value exceeding the threshold value is generated for the vertex key SW02 at Time T2 as described above, the data processing section 4 performs Function 01 shown in FIGS. 6 and 7, and when Function 01 is performed for the first time after Time T2, a measurement by the timer for two keys is started.

Here, in the case of the example shown in FIG. 10A, since the difference value V01 is larger than the difference value V02, the vertex key SW01 continues to be determined as "true" at the time period between Times T2 and T3, and the vertex key SW02 is set to be monitored (the data input operation is determined as "false").

Also, in the example shown in FIG. 10A, since the sensed value for the vertex key SW02 (as well as the sensed value for the vertex key SW01) stays constantly above the threshold value at a time period between Times T2 and T3 (transitional period of time indicated by Time Period t1 predetermined), both of the vertex keys SW01 and SW02 are determined as "true" after Time T3 (after a lapse of Time Period t1 predetermined) at Step S147 shown in FIG. 7.

And, the example shown in FIG. 10B differs from the example shown in FIG. 10A in that a difference value V02b, which is given by the difference between the sensed value generated at Time T2 for the vertex key SW02 and the threshold value, is larger than a difference value V01b, which is given by the difference between the sensed value for the vertex key SW01 and the threshold value, and consequently the vertex key SW02 is determined as "true" and the vertex key SW01 is determined as "false" (to be set to be monitored) at a time period between Times T2 and T3.

In the examples shown FIGS. 10A and 10B, if, at the time period between Time T2 and before Time T3, a change is observed in the value relation between the difference values for the two vertex keys SW01 and SW02 (refer to "No" at Step S143 shown in FIG. 7), a measurement by the timer for two keys is re-started from the time of change.

Description will now be made, with reference to FIG. 8, of a processing (Function 02), which is performed when it is determined at Step S52 shown in FIG. 6 (refer to "Yes" at Step S52) that there exist three vertex keys which meet the requirements described above.

Here, the key switches SW01, SW02 and SW03 are the three vertex keys that meet the above requirements. In the process of Function 02, the data processing section 4 determines whether or not a data entry duration time (to be detailed later) measured by the timer for three keys is equal to or above a prescribed time (Step S161), wherein if the data entry duration time is below the prescribed time (No), the data processing section 4 performs evaluation of the sensed values of the three vertex keys SW01, SW02 and SW03 (signal values compared with the threshold value at the data sensing circuit 3) (Step S162).

The method of evaluating the sensed value at Step S162 is the same as the evaluation method described with reference to FIGS. 9A to 9D except in that comparison is performed between three of the difference values obtained from the difference between the sensed values and the threshold value (or is performed between three of the absolute values of the sensed values) wherein a higher score is assigned to a vertex key having a larger difference value (or sensed value) in descending order of value with respect to the three difference values (or absolute sensed values).

Then, the data processing section 4 determines whether or not the evaluation result on the sensed values and the monitoring classification, which are obtained at Step S162, are the same as the last time (Step S163), wherein if it is determined as "not the same" (No), only two vertex keys to which the two top highest scores are assigned at Step S162 shall be valid and are determined as "true" (Step S164) while one vertex key to which the lowest score is assigned is set to be monitored (Step S165).

Then, the data processing section 4 brings the timer for three keys into action (Step S166), and the processing procedure returns to the earlier described procedure shown in FIG. 6. In the case of this example, at Steps S164 and S165, the monitoring classification falls into six Categories (1) to (6) indicating respective vertex keys to be monitored as shown at Step S162. Also, according to the result of the evaluation of the sensed values at Step S162, the necessary processing operations, such as the storage of the corresponding ON state into the memory section 5 (refer to Tables 2 and 4 in FIG. 3), are executed at an arbitrary appropriate timing to the vertex key which is determined as "true" on a basis of the sensed value comparison information.

Also, if the data entry duration time measured by the timer for three keys is equal to or above the prescribed time (Yes) at Step S161, the data processing section 4 determines that all of the three vertex keys for which the sensed data is entered into the control circuit section 2 shall be valid and are determined as "true" (Step S167), and (after executing the necessary processing operations) the processing procedure returns to the procedure shown in FIG. 6.

On the other hand, if it is determined at Step S163 that the evaluation result on the sensed values and the monitoring classification, which are obtained at Step S162, are the same as the last time (Yes), the processing procedure returns to the procedure shown in FIG. 6.

Figure 10C:
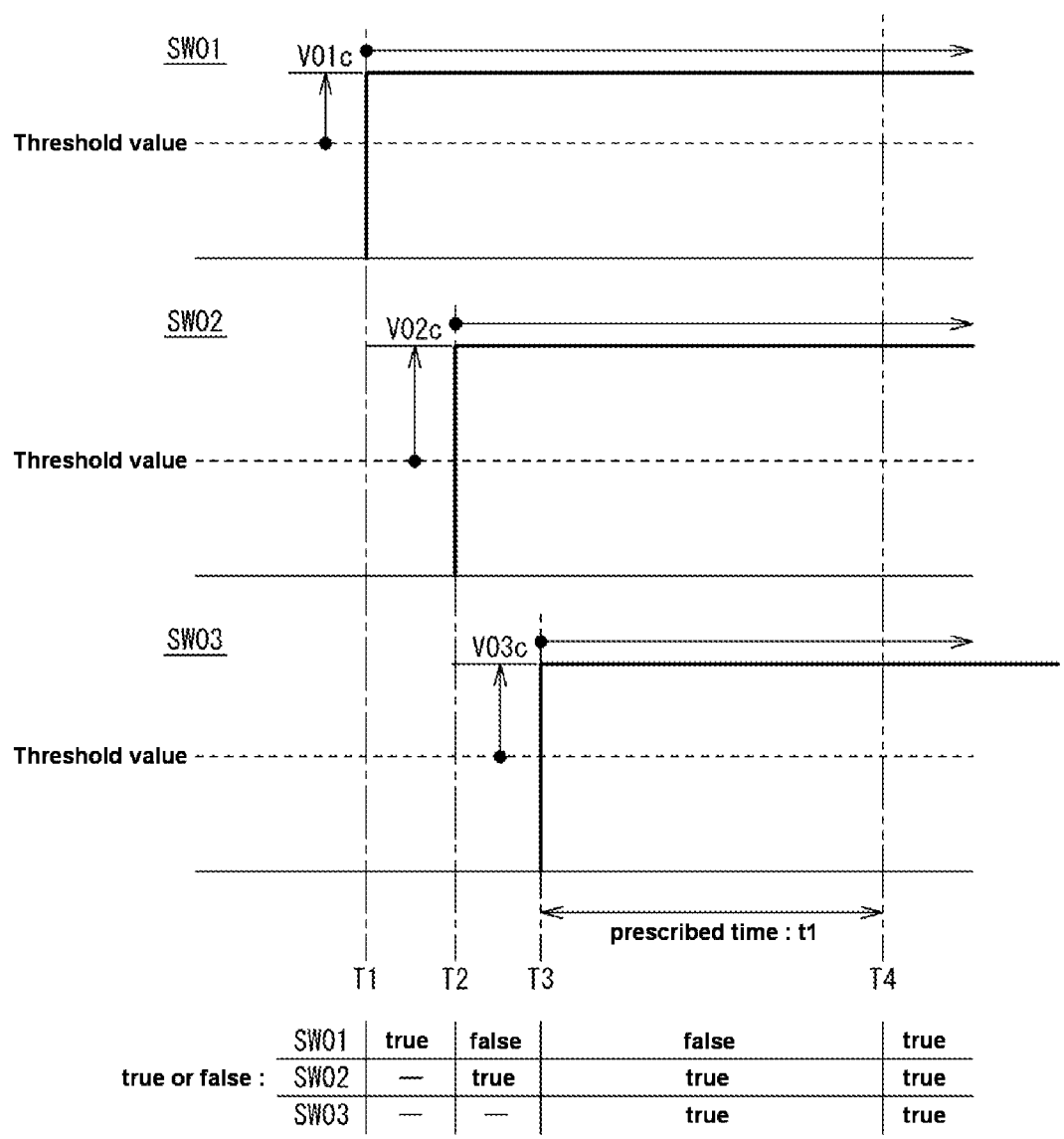
FIG. 10C is a chart of a third example of a method of determining a duration time of data entry for vertex keys of the invalidation determination regions adjacent to each other for the function of the data input device and the method of entering data according to the embodiment of the present invention.
Figure 10D:
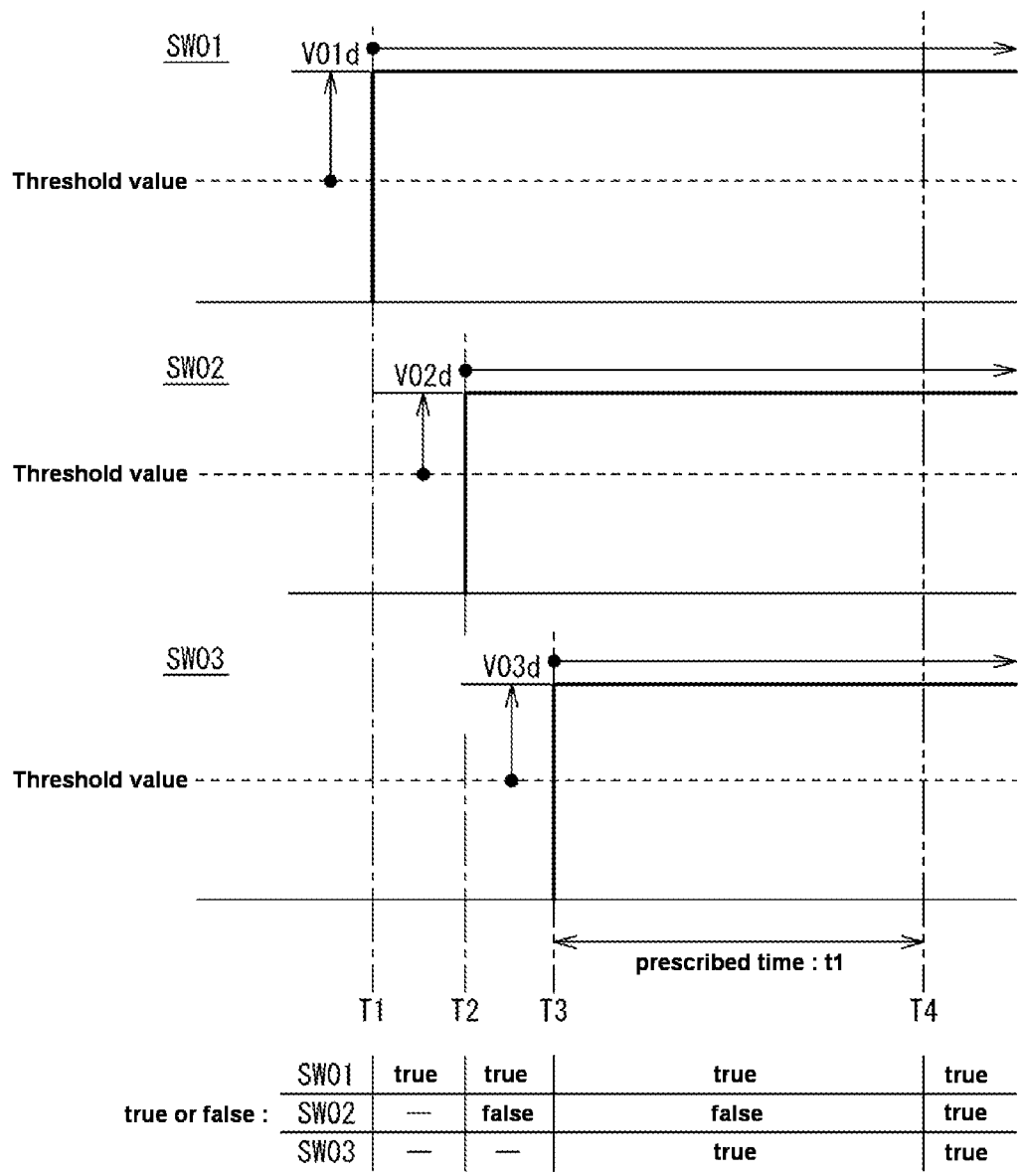
FIG. 10D is a chart of a fourth example of a method of determining a duration time of data entry for vertex keys of the invalidation determination regions located adjacent to each other for the function of the data input device and the method of entering data according to the embodiment of the present invention.
Figure 10E:
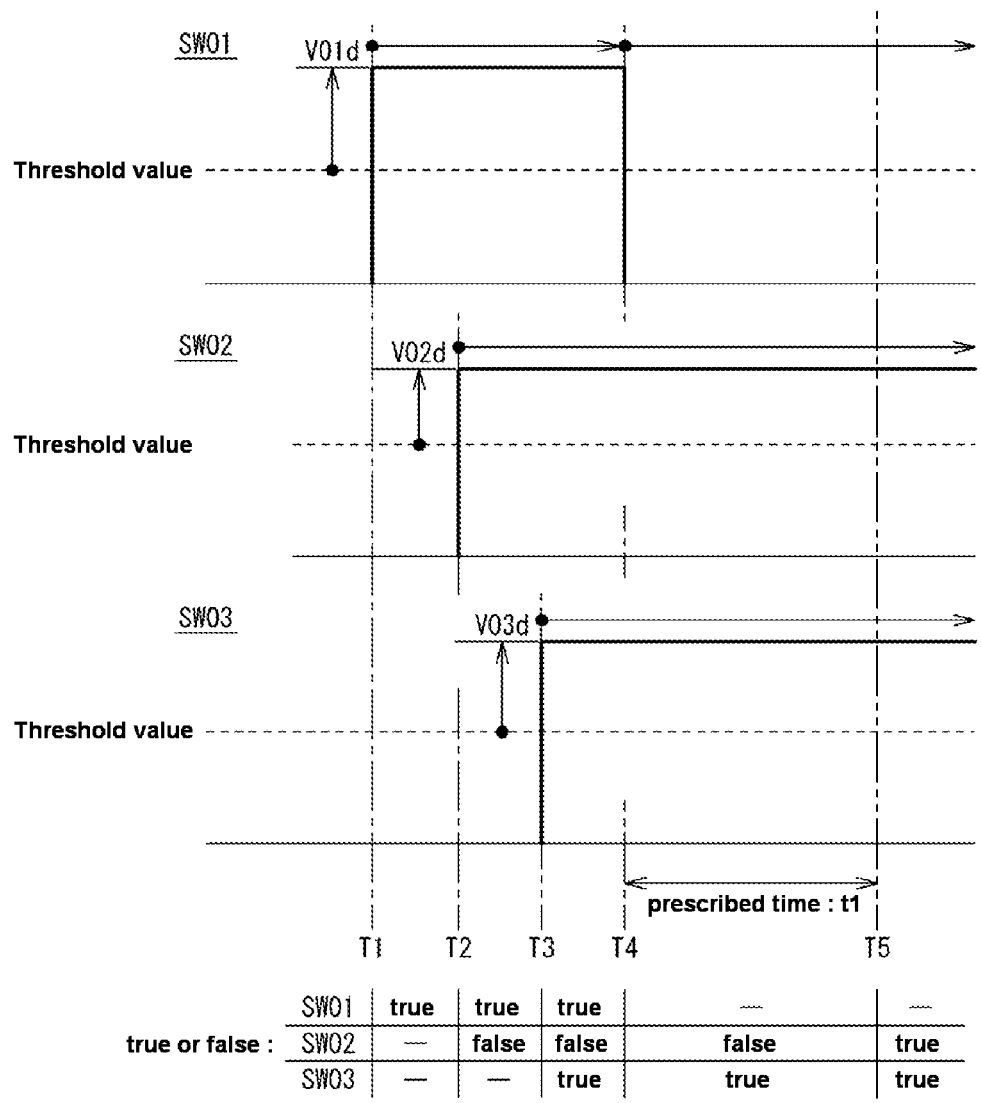
FIG. 10E is a chart of a fifth example of a method of determining a duration time of data entry for vertex keys of the invalidation determination regions located adjacent to one another for the function of the data input device and the method of entering data according to the embodiment of the present invention.
Figure 11:
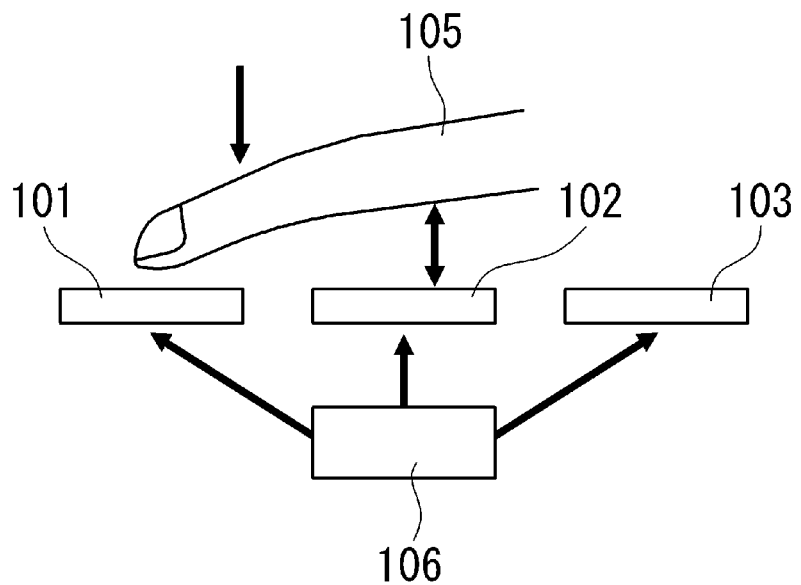
FIG. 11 is a schematic view of how an incorrect data entry is caused in a conventional data input device provided with touch sensors.

Detailed description will be made, with reference FIGS. 10C to 10E, of a "true-or-false" determination of three vertex keys on a basis of data entry duration time. FIGS. 10C to 10E show examples of time charts for sensed value in which a data input operation is implemented to the three vertex keys SW01, SW02 and SW03 almost at the same time.

Referring to FIG. 10C, a sensed value exceeding a threshold value (so as to render a difference value V01c) is generated for the vertex key SW01 at Time T1, then a sensed value exceeding the threshold value (so as to render a difference value V02c which is above the difference value V01c) is generated for the vertex key SW02 at Time T2, and afterward a sensed value exceeding the threshold (so as to render a difference value V03c which is above the difference value V01c and below the difference value V02c) is generated for the vertex key SW03 at Time T3.

In FIG. 10C, the earlier described "true-or-false" determination procedure for two vertex keys is executed at a time period between Times T1 and T3 (here, the time chart for the sensed value is comparable to the time chart of FIG. 10B), and therefore description thereof will be omitted. Then, a sensed value exceeding the threshold value is generated at Time T3, the data processing section 4 performs Function 02 shown in FIGS. 6 and 8, and when Function 02 is executed for the first time after Time T3, a measurement by the timer for three keys is started.

Here, in the case of the example shown in FIG. 10C, the difference value V03c is larger than the difference value V01c and smaller than the difference value V02c thus falling into Category (4) of the monitoring classification shown at Step S162 of FIG. 8, and the vertex key SW01 which is set to be monitored is determined as "false" at a time period between Times T2 and T3 while the vertex keys SW02 and SW03 which are not to be monitored are determined as "true".

And, in the example shown in FIG. 10C, since the sensed value for the vertex key SW03 (as well as the sensed values for the vertex keys SW01 and SW02) stays constantly above the threshold value at a time period between Times T3 and T4 (transitional time period indicated by Time Period t1 predetermined), all of the vertex keys SW01, SW02 and SW03 are determined as "true" after Time T4 (after a lapse of Time Period t1 predetermined) at Step S167 shown in FIG. 7.

The example shown in FIG. 10D differs from the example shown in FIG. 10C in that difference values V01d, V02d and V03d for the vertex keys SW01, SW02 and SW03 meet the value relation where the difference value V03d is larger than the difference value V02d and smaller than the difference value V01d (which falls into Category (2) of the monitoring classification shown at Step S162 of FIG. 8), consequently a time period between Times T1 and T2 is comparable to that of the time chart shown in FIG. 10A, and the vertex key SW02 which is set to be monitored is determined as "false" at the time period between Times T3 and T4 while the vertex keys SW01 and SW03 which are not set to be monitored are determined as "true".

In the examples shown FIGS. 10C and 10D, at the time period between Time T3 and before Time T4, if a change is observed in the value relation between the difference values for the three vertex keys SW01, SW02 and SW03 (refer to "No" at Step S163 shown in FIG. 8), a measurement by the timer for three keys is started again from the time of change.

In the example shown in FIG. 10E, the time period between Time T3 and before Time T4, if a change is observed in the value relation between the difference values for the three vertex keys SW01, SW02 and SW03 (refer to "No" at Step S163 shown in FIG. 8), a measurement by the timer for three keys is started again from the time of change, and, in the time period between Time T4 and before Time T5, if a change is observed in the value relation between the difference values for the two vertex keys SW02 and SW03 (refer to "No" at Step S143 shown in FIG. 7), a measurement by the timer for two keys is started again from the time of change.

The example shown in FIG. 10E is the same as the example shown in FIG. 10D with respect to the time period from Time T1 at which a sensed value exceeding the threshold value is generated for the vertex key SW01 till Time T4 before which a sensed value exceeding the threshold value is generated for the vertex key SW03 at Time T3, but at Time T4, the generation of the sensed value exceeding the threshold value for the vertex key SW01 is stopped.

In this case, the "true-or-false" determination of the two vertex keys SW02 and SW03 after Time T4 is executed by Function 01 described above as shown in FIG. 10E in such a manner that Steps S55 and S56 of the steps shown in FIG. 6 are executed after the determinations at Steps S51 and S52 which is performed first after Time T4 (refer to FIG. 6).

In this connection, if the generation of the sensed value exceeding the threshold value for the vertex key SW02, instead of for the vertex key SW01, is stopped at Time T4 shown in FIG. 10E, the relation of adjacent keys between the vertex keys SW01 and SW03 is removed, and therefore both of the vertex keys SW01 and SW03 are determined as "true" by the procedure from Steps S57 to S60 shown in FIG. 6.

Also, in the data input device 10 according to the present embodiment, the prescribed time which is compared with the data entry duration time measured by the timer for two keys and by the timer for three keys can be set to an arbitrary appropriate time, for example, 100 msec.

Further, in the data input device 10, the timer for two keys and the timer for three keys are configured to start to measure time from the moment when the sensed value of either of two or three vertex keys that exceeds the threshold value last is generated, and consequently it is obvious that if the data entry duration time measured by the timer for two keys and the timer for three keys is above the prescribed time, then the data entry duration time for the vertex key to which the lowest score for the sensed value evaluation is assigned is above the prescribed time regardless of whichever vertex key of the plurality of relevant vertex keys has the lowest score.

Further in the data input device 10, the control circuit section 2 may be constituted by a conventional microcomputer system which includes a central processing unit, a memory, an input/output circuit, and the like, wherein the memory section 5 and the data processing section 4 which are constituent elements of the control circuit section 2 may be implemented by an arbitrary hardware or software or combination thereof, as long as the above described functions of the both constituent elements are duly performed. In this case, the timer for two keys and the timer for three keys may be implemented, for example, by a conventional timer or counter which is provided in the microcomputer system mentioned above.

Alternatively, the timer for two keys and the timer for three keys may be configured as a time measurement means, wherein the data entry duration time is measured by counting the number of times of acquiring the sensed data for the relevant vertex keys, which are acquired repeatedly at the data entry sensing circuit 3 with the scanning of the touch sensor 7.

Thus, in the data input device 10 and the data entry method according to the present embodiment, a false data input operations can be effectively determined, whereby the operability of a highly sensitive data input device incorporating an electrostatic capacitance type touch sensor can be enhanced. Moreover, in the data input device 10 and the data entry method according to the present embodiment, the data input operation implemented intentionally to two or more key switches at the same time can be determined as "true".

For example, in the case of the invalidation determination region A shown in Table 2 of FIG. 3, even if key switches other than the key switches SW12, SW13 and SW14 are in the ON state when a data input operation is implemented to the key switch SW23, it does not happen that the data input operation to the key switch SW23 is determined as "false".

As a result, especially in the case of a data input device (for example, a keyboard for a personal computer) in which a relatively large number of key switches are provided on a data input operation surface and in which the operator is supposed to enter data at a high speed, for example, by using a plurality of fingers of the both hands, the operability can be significantly enhanced.

Furthermore, in the data input device 10, a data input operation implemented to a plurality of vertex keys, which are included in the invalidation determination regions and at the same time which are located adjacent to each other and arrayed laterally with respect to the operator, can be determined as "true/false" by means of the true-or-false determination shown in FIGS. 6 to 8, whereby an incorrect data entry can be further effectively prevented and so the operability of the data input device 10 can be enhanced.

The method of true-or-false determination for the vertex keys in the data entry method using the function of the data input device 10 and using the data input device 10 is not limited by the action of the operator assumed to be taken in accordance with the method, wherein the true data input operation and the false data input operation are enabled to be appropriately determined from each other based on the findings that when sensed values are generated at the same time for a plurality of key switches located adjacent to one another, a larger sensed value is generally more likely to be generated for the key switch to which the operator intends to enter data (due to the fact that the finger or the like of the operator is more likely to be positioned close to the touch sensor corresponding to the intended key switch), and also that even when slight difference is seen in sensed values generated at the same time for the plurality of key switches located adjacent to one another, it is highly possible that the operator implements the data input operation intentionally to the plurality of key switches if the generation of the sensed values is maintained for a rather long time.

The present invention has been described with respect to the specific embodiment but is by no means limited thereto. For example, the data input device according to the present invention may include an electrostatic capacitance type touch sensor to continuously sense the position of a data input operation on a data input operation surface, wherein the specific position (or range) of the data input operation is defined by a data corresponding to a value (or range of value) actually read out from an arbitrary appropriate two-dimensional coordinate established along the data input operation surface.

Also, the data sensing circuit 3 may include an amplification means (not shown) to amplify the sensed value from the touch sensor 7 and a comparison means (not shown) to compare the sensed value amplified with the prescribed threshold value, wherein the data sensing circuit 3 sends out sensed information to the control circuit section 2 when the sensed value amplified is equal to or above the prescribed threshold value, in which case amplification factors may be set individually, instead of setting the threshold values individually as shown in FIGS. 9C and 9D.

And, in the present embodiment, the data sensing circuit 3 is arranged inside the operation section 1, but the present invention is not limited to such an arrangement and the data sensing circuit 3 may alternatively be arranged outside the operation section 1.

What is claimed is:

1. A data input device for an electronic instrument, the data input device comprising:
    an operation section which comprises a flat data input operation surface, and an electrostatic capacitance type touch sensor to sense a data input operation implemented to the data input operation surface; and
    a control circuit section into which sensed data on the data input operation from the operation section is entered, and which determines if the data input operation is true or false and sends to an electronic instrument an output data corresponding to the sensed data only when the data input operation is determined as true based on invalidation determination region information, in which a plurality of invalidation determination regions is previously prepared for each of a plurality of coordinates, each of the plurality of invalidation determination regions having a validated coordinate, respectively,
    wherein when one or more of the sensed data are entered into the control circuit section, the control circuit section identifies one or more of the validated coordinates, at each of which the data input operation is determined as true based on invalidation determination region information, and
    wherein when the control circuit section identifies one or more of the validated coordinates, each of which the data input operation is determined as true, the control circuit section determines data input operation to a coordinate, which is other than the validated coordinate within the respective invalidation determination region, as false.

2. A data input device according to claim 1, wherein the control circuit section comprises:
    a memory section which stores information, with respect to each coordinate, whether or not there exist the sensed data for coordinates located at a position on the data input operation surface wherein the data input operation is implemented to the position, and also which stores the invalidation determination region information previously prepared for each of the coordinates at the position to which the data input operation is implemented; and
    a data processing section which identifies a coordinate to determine a data input operation as true within the invalidation determination region previously prepared for each of the one or more of the coordinates for which information that the sensed data is entered is stored in the memory section, and which determines the data input operation as false which is implemented to a coordinate other than the identified coordinate to determine the data input operation as true among a group aggregate of the coordinates corresponding to the sensed data within the invalidation determination region.

3. A data input device according to claim 2, wherein the data processing section determines a data input operation as true which is implemented to a coordinate located farthest from an operator within the invalidation determination region previously prepared for each of the one or more of the coordinates for which information that the sensed data is entered is stored in the memory section.

4. A data input device according to claim 2, wherein the invalidation determination region, which is previously prepared for each of coordinates other than coordinates corresponding to one or more of particular positions previously defined, is defined so as not to include the coordinates corresponding to the one or more of particular positions previously defined.

5. A data input device for an electronic instrument, the data input device comprising:
   an operation section which comprises a flat data input operation surface, and an electrostatic capacitance type touch sensor to sense a data input operation implemented to the data input operation surface; and
   a control circuit section into which sensed data on the data input operation from the operation section is entered, and which determines if the data input operation is true or false and sends to an electronic instrument an output data corresponding to the sensed data only when the data input operation is determined as true based on invalidation determination region information, in which a plurality of invalidation determination regions is previously prepared for each of a plurality of coordinates, each of the plurality of invalidation determination regions having a validated coordinate, respectively,
   wherein if one or more of the sensed data are entered into the control circuit section, the control circuit section identifies one or more of the validated coordinates, at each of which the data input operation is determined as true based on invalidation determination region information, and wherein when the control circuit section identifies one or more of the validated coordinates, each of which the data input operation is determined as true, a sensitivity for outputting the sensed data is lowered with respect to the data input operation which is implemented to a coordinate, which is other than the validated coordinate, to determine the data input operation as true among a group aggregate of the coordinates corresponding to the sensed data within the respective invalidation determination region.

6. A data input device for an electronic instrument, the data input device comprising:
   an operation section which comprises a flat data input operation surface, and an electrostatic capacitance type touch sensor to sense a data input operation implemented to the data input operation surface; and
   a control circuit section into which sensed data on the data input operation from the operation section is entered, and which determines if the data input operation is true or false and sends to an electronic instrument an output data corresponding to the sensed data only when the data input operation is determined as true based on invalidation determination region information, in which a plurality of invalidation determination regions is previously prepared for each of a plurality of coordinates, each of the plurality of invalidation determination regions having a validated coordinate, respectively,
   wherein if one or more of the sensed data are entered into the control circuit section, the control circuit section identifies one or more of the validated coordinates, at each of which the data input operation is determined as true based on invalidation determination region information, and
   wherein when the control circuit section identifies one or more of the validated coordinates, each of which the data input operation is determined as true, the control circuit section determines data input operation to a coordinate which is other than the validated coordinate within the respective invalidation determination region, as false, and at the same time wherein when the coordinate to determine the data input operation as true is identified, if the sensed data is entered for a vertex coordinate corresponding to a position located farthest from an operator within the invalidation determination region previously prepared and also if a plurality of vertex coordinates to which the sensed data are entered are disposed adjacent to one another, the control circuit section identifies the coordinate which determines the data input operation as true based on a number of the plurality of vertex coordinates, a comparison data of sensed values of the sensed data corresponding to the plurality of vertex coordinates, and a duration time information for entering the sensed data corresponding to the plurality of vertex coordinates.

7. A data input device according to claim 6, wherein the control circuit section comprises:
   a memory section which stores information, with respect to each coordinate, whether or not there exist the sensed data for coordinates located at a position on the data input operation surface wherein the data input operation is implemented to the position, and also which stores the invalidation determination region information previously prepared for each of the coordinates at the position to which the data input operation is implemented; and
   a data processing section which identifies a coordinate to determine a data input operation as true within the invalidation determination region previously prepared for each of the one or more of the coordinates for which information that the sensed data is entered is stored in the memory section, and which determines the data input operation as false which is implemented to a coordinate other than the identified coordinate to determine the data input operation as true among a group aggregate of the coordinates corresponding to the sensed data within the invalidation determination region, and at the same time in that when the coordinate to determine the data input operation as true is identified, if the sensed data is entered for a vertex coordinate corresponding to a position located farthest from an operator within the invalidation region and also if a plurality of vertex coordinates to which the sensed data are entered are disposed adjacent to one another, the control section identifies the coordinate which determines the data input operation as true based on a number of the plurality of vertex coordinates, a comparison data of sensed values of the sensed data corresponding to the plurality of vertex coordinates, and a duration time information for entering the sensed data corresponding to the plurality of vertex coordinates.

8. A data input device according to claim 7, wherein the data processing section determines, based on the comparison data of sensed values, a data input operation as true which is implemented to vertex coordinates out of three or less of the vertex coordinates to which the sensed data is entered, excluding the vertex coordinate to which a lowest score is assigned with respect to an evaluation of a sensed value of the sensed data.

9. A data input device according to claim 8, wherein when a data entry duration time, which is taken for entering the sensed data for the vertex coordinate having a lowest score with respect to the evaluation of the sensed value of the sensed data, elapses for more than a prescribed time, the data processing section determines, based on the data entry duration time information, the data input operation as true which is implemented to the vertex coordinate having a lowest score.

10. A data input device according to claim 7, wherein the invalidation determination region, which is previously prepared for each of coordinates other than coordinates corresponding to one or more of particular positions previously defined, is defined so as not to include the coordinates corresponding to the one or more of particular positions previously defined.

11. A data input device for an electronic instrument, the data input device comprising:
   an operation section which comprises a flat data input operation surface, and an electrostatic capacitance type touch sensor to sense a data input operation implemented to the data input operation surface; and
   a control circuit section into which sensed data on the data input operation from the operation section is entered, and which determines if the data input operation is true or false and sends to an electronic instrument an output data corresponding to the sensed data only when the data input operation is determined as true based on invalidation determination region information, in which a plurality of invalidation determination regions is previously prepared for each of a plurality of coordinates, each of the plurality of invalidation determination regions having a validated coordinate, respectively,
   wherein if one or more of the sensed data are entered into the control circuit section, the control circuit section identifies one or more of the validated coordinates, at each of which the data input operation is determined as true based on invalidation determination region information, and
   wherein when the control circuit section identifies one or more of the validated coordinates, each of which the data input operation is determined as true, a sensitivity for outputting the sensed data is lowered with respect to the data input operation which is implemented to a coordinate, which is other than the validated coordinate, to determine the data input operation as true among a group aggregate of the coordinates corresponding to the sensed data within the respective invalidation determination region, and
   at the same time in that when the coordinate to determine the data input operation as true is identified, if the sensed data is entered for a vertex coordinate corresponding to a position located farthest from an operator within the invalidation determination region previously prepared and also if a plurality of vertex coordinates to which the sensed data are entered are disposed adjacent to one another, the control circuit section identifies the coordinate which determines the data input operation as true based on a number of the plurality of vertex coordinates, a comparison data of sensed values of the sensed data corresponding to the plurality of vertex coordinates, and a duration time information for entering the sensed data corresponding to the plurality of vertex coordinates.

12. A method of entering data for a data input device which is for use with an electronic instrument and which comprises:
   an operation section which comprises: a flat data input operation surface; and an electrostatic capacitance type touch sensor to sense a data input operation implemented to the data input operation surface; and
   a control circuit section into which sensed data of the data input operation sent from the operation section is entered,
   wherein the method of entering data comprises:
      a step of determining if the data input operation corresponding to the sensed data entered from the operation section is true or false; and
      a step of sending to an electronic instrument an output data corresponding to the sensed data only when the data input operation is determined as true based on invalidation determination region information, in which a plurality of invalidation determination regions is previously prepared for each of a plurality of coordinates, each of the plurality of invalidation determination regions having a validated coordinate, respectively,
   wherein the step of determining if the data input operation corresponding to the sensed data entered from the operation section is true or false includes a process where if one or more of the sensed data are entered, at least one validated coordinate is identified, at each of which the data input operation is determined as true based on an invalidation determination region information, and
   where when the at least one validated coordinate is identified, each of which the data input operation is determined as true, the data input operation to a coordinate, which is other than the validated coordinate within the respective invalidation determination region is determined as false, or a sensitivity for outputting the sensed data is lowered with respect to the data input operation which is implemented to a coordinate, which is other than the validated coordinate, to determine the data input operation as true among the group aggregate of the coordinates corresponding to the sensed data within the respective invalidation determination region.

13. A method of entering data for a data input device which is for with an electronic instrument and which comprises:
   an operation section comprises: a flat data input operation surface; and an electrostatic capacitance type touch sensor to sense a data input operation implemented to the data input operation surface; and
   a control circuit section into which sensed data of the data input operation sent from the operation section is entered,
   wherein the method of entering data comprises:
      a step of determining if the data input operation corresponding to the sensed data entered from the operation section is true or false; and
      a step of sending to an electronic instrument an output data corresponding to the sensed data only when the data input operation is determined as true, based on invalidation determination region information, in which a plurality of invalidation determination regions is previously prepared for each of a plurality of coordinates, each of the plurality of invalidation determination regions having a validated coordinate, respectively
   wherein the step of determining if the data input operation corresponding to the sensed data entered from the operation section is true or false includes a process where if one or more of the sensed data are entered, at least one validated coordinate is identified, at each of which the data input operation is determined as true based on an invalidation determination region information, and
   where when the at least one validated coordinate is identified, each of which the data input operation is determined as true, the data input operation to a coordinate, which is other than the validated coordinate within the respective invalidation determination region is determined as false, or a sensitivity for outputting the sensed data is lowered with respect to the data input operation which is implemented to a coordinate, which is other than the validated coordinate, to determine the data input operation as true among the group aggregate of the coordinates corresponding to the sensed data within the respective invalidation determination region, and
   at the same time where when the coordinate, which determines the data input operation as true, is identified, if the sensed data for a vertex coordinate corresponding to a position located farthest from an operator and also if a plurality of vertex coordinates to which the sensed data are entered are disposed adjacent to one another, the coordinate is identified which determines the data input operation as true based on a number of the plurality of vertex coordinates, a comparison data of sensed values of the sensed data corresponding to the plurality of vertex coordinates, and a duration time data of entering the sensed data corresponding to the plurality of vertex coordinates.

* * * * *